US009311222B1

(12) United States Patent
Avery et al.

(10) Patent No.: US 9,311,222 B1
(45) Date of Patent: Apr. 12, 2016

(54) USER INTERFACE TESTING ABSTRACTION

(71) Applicant: CA, Inc., Islandia, NY (US)

(72) Inventors: Devin B. Avery, Madbury, NH (US); Jacob H. Stoddard, Somersworth, NH (US)

(73) Assignee: CA, Inc., Islandia, NY (US)

( * ) Notice: Subject to any disclaimer, the term of this patent is extended or adjusted under 35 U.S.C. 154(b) by 176 days.

(21) Appl. No.: 14/092,888

(22) Filed: Nov. 27, 2013

(51) Int. Cl.
*G06F 11/00* (2006.01)
*G06F 11/36* (2006.01)
*G06F 3/0481* (2013.01)

(52) U.S. Cl.
CPC .......... *G06F 11/3668* (2013.01); *G06F 3/0481* (2013.01)

(58) Field of Classification Search
CPC ........................... G06F 11/3668; G06F 3/0481
See application file for complete search history.

(56) References Cited

U.S. PATENT DOCUMENTS

| | | | | |
|---|---|---|---|---|
| 2008/0155514 | A1 * | 6/2008 | Couldwell et al. | 717/135 |
| 2010/0146420 | A1 * | 6/2010 | Bharadwaj et al. | 715/764 |
| 2011/0138357 | A1 * | 6/2011 | Mishra et al. | 717/124 |

* cited by examiner

*Primary Examiner* — Philip Guyton
(74) *Attorney, Agent, or Firm* — Patent Capital Group

(57) ABSTRACT

Interactions with a particular graphical user interface (GUI) of a software system are caused to be recorded and a particular one of the interactions is identified as an interaction with a particular GUI element of the GUI. A particular type of GUI element corresponding to the particular GUI element is determined and at least a portion of an instruction is generated for inclusion in a test of the software system, the instruction referencing the particular GUI element as an instance of the particular type of GUI element.

21 Claims, 14 Drawing Sheets

USER INTERFACE TESTING ABSTRACTION

BACKGROUND

The present disclosure relates in general to the field of computer testing, and more specifically, to testing of software graphical user interfaces.

Deployments of composite applications and systems are increasing. Many software products include graphical user interfaces (or GUIs) to allow users to interface with the functionality provided through the software. User experience has emerged as important differentiator and GUI design can attempt to improve and optimize user experience to make user's interactions with the software not only more efficient but also more enjoyable to the user. In some cases, the GUIs of a software application can iterate faster than the underlying functionality. Further, computer languages used to construct GUIs and GUI elements continue to evolve adding additional volatility to GUI design.

Test stubs have been developed to test operability of software systems for certain pre-defined scenarios. A wide variety of tests are utilized in connection with the development and maintenance of software systems. For instance, regression testing can be used to uncover new software bugs, or regressions, in components of a system. In another example, load testing can be used to test the response of a system to various load conditions, such as peak or spiking load conditions.

BRIEF SUMMARY

According to one aspect of the present disclosure, interactions with a particular graphical user interface (GUI) of a software system can be caused to be recorded and a particular one of the interactions can be identified as an interaction with a particular GUI element of the GUI. A particular type of GUI element corresponding to the particular GUI element can be determined and at least a portion of an instruction can be generated for inclusion in a test of the software system, the instruction referencing the particular GUI element as an instance of the particular type of GUI element.

BRIEF DESCRIPTION OF THE DRAWINGS

Like reference numbers and designations in the various drawings indicate like elements.

DETAILED DESCRIPTION

Figure 1:
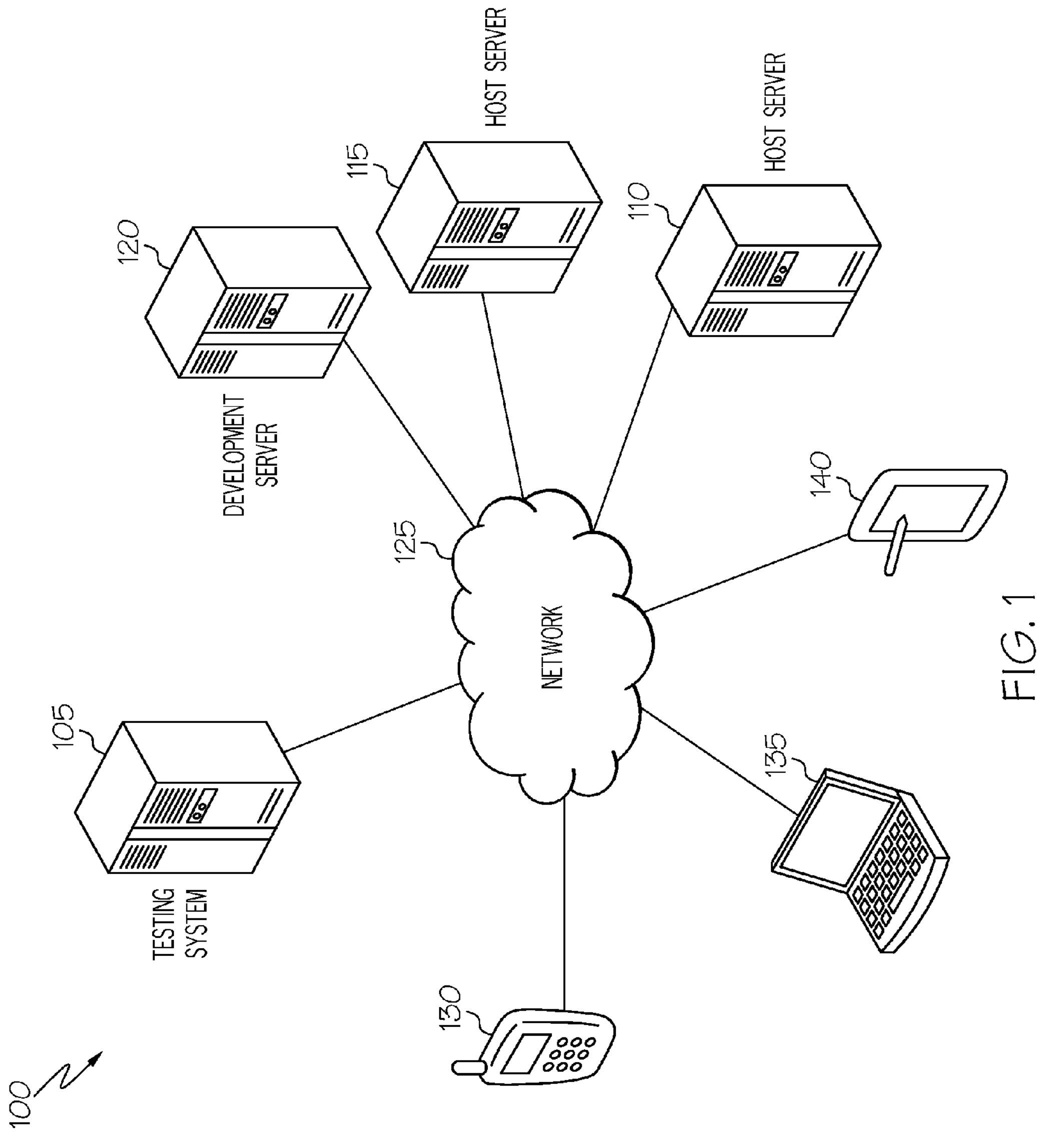
FIG. 1 is a simplified schematic diagram of an example computing system including an example testing system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the “C” programming language, Visual Basic, Fortran 2003, Perl, COBOL 2002, PHP, ABAP, dynamic programming languages such as Python, Ruby and Groovy, or other programming languages. The program code may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a simplified block diagram illustrating an example computing environment 100 including a testing system 105, one or more host servers 110, 115 or other computers hosting software applications or other programs, as well as potentially one or more development servers 120 hosting software under development together with associated GUIs. Testing system 105 can include a set of automated tests that can be run against the programs hosted on computing devices 110, 115, 120. The automated tests, in some instances, can simulate a user’s interactions with the software (e.g., through the software’s GUI(s)) and the testing system 105 can monitor the reaction of the software to the simulated user interactions. In some cases, testing system can include, or have access to, an test abstraction layer that can be utilized during the tests to translate an automated test’s reference to a logical GUI component (e.g., a button, pop-up window, text field, radio button, checkbox, table, etc.) into a reference to the specific implementation of the logical GUI component in the GUI of the software under test.

The testing system 105 can also possess functionality for recording a user’s interactions with a software application. The recorded interactions can be used to generate an automated test that will later simulate these interactions in a test of the software application. The abstraction layer can also be used to translate recorded interactions with specific GUI elements into corresponding abstractions of the GUI elements, for instance, as types of logical GUI elements with particular display names, among other examples. The abstraction layer can be implemented or hosted entirely or partially on the testing system. In other implementations, the abstraction layer utilized with the testing system 105 can be hosted in whole or in part on a computing device remote from the testing system 105, among other examples. Testing system 105 can communicate with such instances of the abstraction layer as well as one or more other remote computing devices (e.g., 110, 115, 120, 130, 135, 140) in the environment over one or more networks 125, including private, public, local, and wide area networks.

Computing environment 100 can additionally include one or more user devices (e.g., 130, 135, 140) that can consume data, services, and other resources of other computing devices (e.g., 105, 110, 115, 120) in the computing environment 100. For instance, user devices (e.g., 130, 135, 140) can interface with testing system 105 to configure, generate, and run tests on remote or local software components. In some instances, testing system 105 can be provided as a service for consumption using user computing devices (e.g., 130, 135, 140). User computing devices (e.g., 130, 135, 140) can also be used, for instance, to record new tests based on recorded user interactions with the software to be tested using testing system 105. User computing devices (e.g., 130, 135, 140) can thus also be used to interface with and, in some cases, develop software provided at host devices 110, 115, 120. User devices (e.g., 130, 135, 140) can also be used to edit, develop, and otherwise managing a GUI abstraction layer used by testing system 105, among other uses and examples.

In general, “servers,” “clients,” “computing devices,” “network elements,” “hosts,” “system-type system entities,” “user devices,” and “systems”, etc. (e.g., 105, 110, 115, 120, 130, 140, etc.) in example computing environment 100, can include electronic computing devices operable to receive, transmit, process, store, or manage data and information associated with the computing environment 100. As used in this document, the term “computer,” “processor,” “processor device,” or “processing device” is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 130, 140, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a testing system 105, the abstraction layer, host servers (e.g., 110, 115, 120, etc.) or other sub-system or component of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

In some cases, GUIs developed for applications and other software can be subject to volatility. First, in some instances, modifications and versioning of the GUI can be more frequent than versioning of the underlying functionality. For instance, as languages and platforms used in GUI development evolve, developers may choose to substitute all or portions of an earlier version of the GUI with a new GUI version that employs the enhanced (or more up-to-date) language, library, or platform. Second, languages and libraries used in GUI development can, themselves, be subject to volatility as updates to the GUI platforms take place. In the case of browser-based GUIs used, for example, in software that is at least partially web-based, changes can take place to HTML and the underlying internal model (such as a document object model (DOM)) employed by the various browsers supporting the application and functioning, at least in part, as the application's GUI, among other examples Tests can be developed that test the functionality of software programs including their corresponding GUIs. Automated tests can provide functionality for simulating inputs that might be made by a user (or other system) to observe how the program responds and whether the program responds as predicted. Automated tests can also be developed that simulate interactions with a GUI, including specific GUI elements, such as a particular button, text field, drop down menu, link, checkbox, table, media player, or other element. Testing of a software application and associated GUI can involve the development of a library of tests to test a myriad of different use cases and scenarios to verify correct operation of the software (including operation of the software in connection with other cooperating systems (e.g., a third party back end service, etc.). The volatility in GUIs can jeopardize the lifespan of at least some of these tests as changes are made to the underlying files and objects of the GUIs for which the tests have be written. For instance, traditional automated tests of GUIs can rely directly on the language or model in which the GUIs are embodied, such as the specific HTML code or DOM. In some cases, the logical nature of the GUI may remain constant even while the underlying implementation of the GUI is modified. For example, a GUI supporting a search function may include a search text field (e.g., for entering a search query) and search button (e.g., to launch the search). In an early implementation of the GUI, the text field may be implemented as code in a first language referencing the text field by a first identifier, or first identification criteria, used to find the particular GUI element with attributes matching the criteria. Such identifiers can include, for instance, explicit identifiers (e.g., a name or other ID) as well as implicit identifiers, such as parent-child relationships of the GUI element with other GUI elements within a defined model, etc. Likewise, the search button may also be implemented in the first language by its own corresponding identifier. In an update to the GUI, a second language (such as newer version of the first language) may be used to improve upon the earlier version of the GUI. Accordingly, the search test field (and/or search button) in the updated GUI may be implemented in the second language and even referenced by a different, second identifier. These changes, however, can make automated tests developed to identify and interact with the previous version of the GUI elements obsolete. Indeed, in some instances, the test management tools used to record interactions with the earlier version of the GUI and generate automated tests and use the automated tests may also be incompatible with the changes to the underlying GUI code. Repurposing the library of tests and testing tools for each and every instantiation or update of a GUI can be costly and infeasible, among other example disadvantages.

In one example, a GUI abstraction layer can be provided, such as described in the systems and examples herein, that address at least some of the issues above. A GUI abstraction layer can support the development and execution of automated tests on GUIs and individual GUI elements across multiple versions by abstracting the specific implementation of GUI elements (e.g., the specific HTML code implementation of a GUI button used in connection with a search prompt) into logical constructs (e.g., a "search button"). This abstraction can allow test management tools generating and conducting automated tests of GUIs to conceptualize and address a GUI similar to the way a user would, by its logical elements. In some instances, a GUI abstraction layer can simplify design, creation, and validation of automated tests while at the same time at least partially insulating automated tests from the volatility of the GUIs, among other example advantages and uses.

Figure 2:
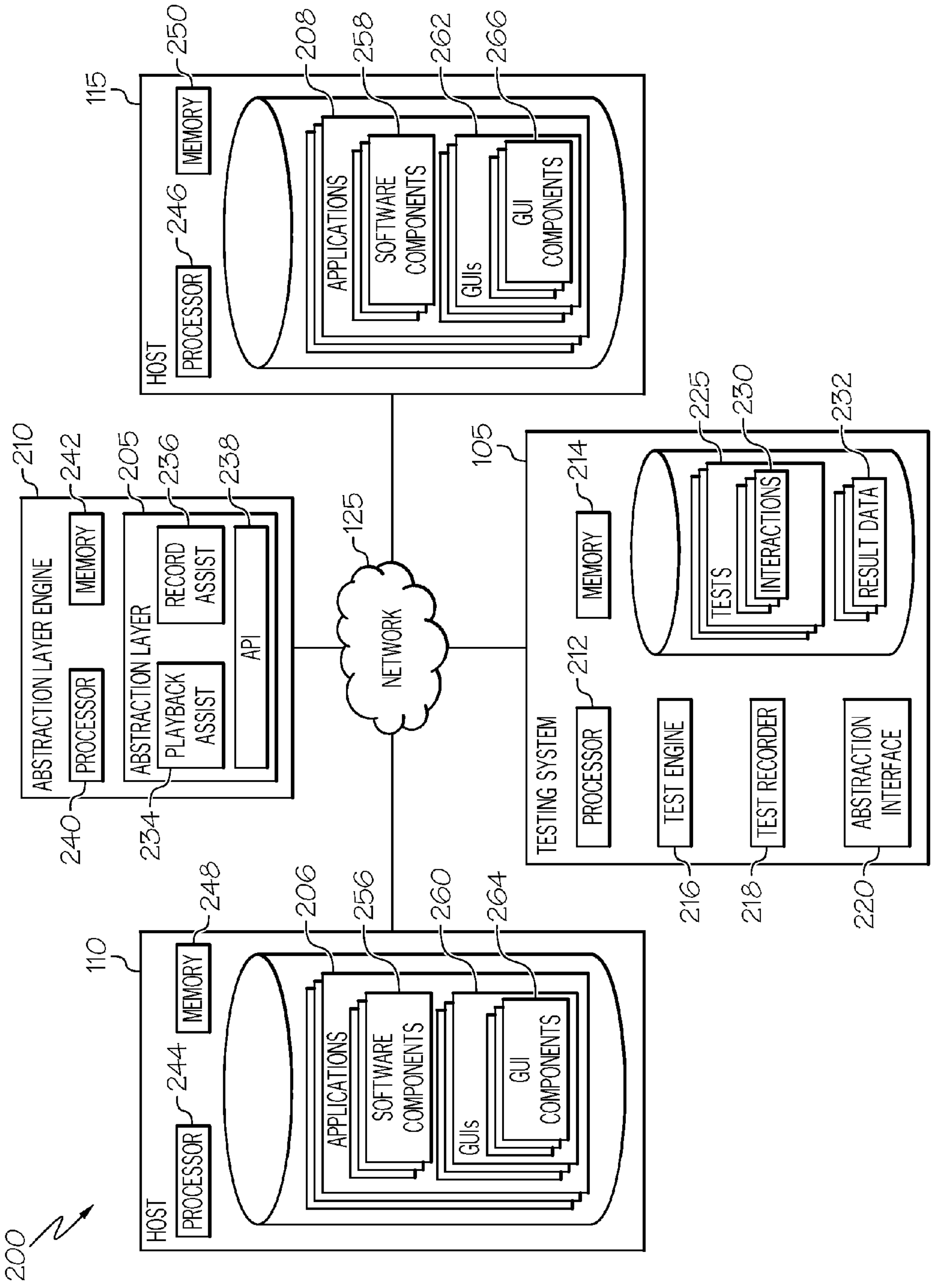
FIG. 2 is a simplified block diagram of an example computing system including an example testing system and abstraction layer in accordance with at least one embodiment.

Turning to the example of FIG. 2, a simplified block diagram 200 is shown illustrating an example environment 200 including a testing system 105, abstraction layer 205 (e.g., implemented using an abstraction layer engine 210 or on testing system 105, etc.), and one or more hosts 110, 115 hosting one or more services, database management systems, programs, or applications (referred to in this example collectively as "applications" (e.g., 206, 208). Systems and subsystems of the environment (e.g., 105, 110, 115, 210, etc.) can communicate, interoperate, and otherwise interact, for instance, over one or more networks (e.g., 125). In one example implementation, a testing system 105 can include one or more processor devices (e.g., 212) and one or more memory elements (e.g., 214) and machine executable logic embodied in hardware- and/or software-based components such as a test engine 216, test recorder 218, abstraction layer interface 220, among other potential tools and components including combinations or further compartmentalization of the foregoing. In some implementations, testing system 105 can be implemented as multiple different systems including, for example, varying combinations of the foregoing components and tools (e.g., 216, 218, 220, etc.) and accompanying data and programs (e.g., 225, 230, 232).

In one example, testing system 105 can include a test engine 216 configured to test software components of various applications (e.g., 206, 208), including associated GUIs (e.g., 260, 262) and component GUI elements (e.g., 264, 266). The test engine 216 can execute automated tests 225 generated for the applications (e.g., 206, 208), causing simulated interactions (e.g., 230) with the application (e.g., 206, 208) defined in the test 225 to be performed, such as interactions with a specific GUIs (e.g., 260, 262) and component GUI elements (e.g., 264, 266) of the applications under test. The test engine 216 can further observe responses of the application (and its constituent software components (e.g., 256, 258) and GUIs (e.g., 260, 262)) to determine results of the test. Results can be embodied in result data 232 generated or gathered, for instance, by the test engine 216 in response the tests 225.

Testing system 105 can further include functionality for generating tests 225. In some instances, tests 225 can be generated by recording sample interactions with the application to be tested. The test recorder can record sample interactions, including sample interactions with a deployed version of the application, and the recorded interactions (e.g., 230) can be played back as a subsequent test (e.g., 225) to determine whether these interactions elicit an appropriate response in various contexts defined in the test 225, among other examples.

Automated testing of GUIs (e.g., 260, 262) and constituent GUI elements (e.g., 264, 266) of applications (e.g., 206, 208) can make use of a GUI abstraction layer 205. Testing system 105, in some implementations, can include an abstraction layer interface (e.g., in connection with an API 238 of the abstraction layer 205) that allows the testing system 105 to utilize the abstraction layer in one or more of test recording, test playback, and test result collection provided through components (e.g., 216, 218) of the testing system 105. For instance, tests 225 can be written to reference particular GUI elements (e.g., 264, 266) by their respective logical or functional constructs rather than their actual constructs as embodied in the code of the GUIs 260, 262. The tests 225, and their composite interactions 230, can be thus constructed to perform a generalized type of action on a corresponding type of GUI element rather than specifying the precise action to be performed on the specific implementation of the GUI element presently in the current version of the GUI. The abstraction layer 205 can be used to translate interactions 230 with logical components into the specific interactions with the specific GUI elements embodied in the particular GUI development language or platform underlying the files or objects of the GUIs.

In some implementations, abstraction layer 205 can be implemented with an abstraction layer engine 210 (e.g., including one or more processor devices (e.g., 212) and one or more memory elements (e.g., 214)) that can be provided as logic distinct from (and in some cases hosted remote from) the logic implementing testing system 105. In other implementations, abstraction layer 205 can be implemented as a sub-component to add-on to testing system 105 and can be collocated with computers hosting the testing system, among other potential configurations.

In one example implementation, abstraction layer 205 can include a mapping of logical constructions of GUI elements (e.g., GUI element types) to one or more specific implementations of the GUI element types. The abstraction layer 205 can include logic to identify a logic abstraction of a GUI element type and query code of a particular GUI file (e.g., GUI 260, 262 of an application under test) to determine whether an instance of the GUI type is present in the GUI file. In some implementations, logical constructs of a GUI element can be identified by the display name of the GUI, to further tie the logical constructs of the GUI element to users' perspective of the GUI element. Accordingly, the abstraction layer 205 can query the source GUI file for a GUI element of a particular type having a specified display name, among other examples.

Abstraction layer 205 can further include logic (e.g., 234, 236) to assist in test playback and test recording by a testing system 105 (e.g., accessed by the testing system 105 through API 238). Functionality and tasks included in the execution (e.g., playback) or recording of an automated test using abstraction layer 205 can be delegated between testing system 105 and the logic of the abstraction layer in a variety of ways. Indeed, in instances where the abstraction layer 205 is more tightly integrated with the logic of the testing system 105, the division of work between abstraction layer 205 and testing system 105 can be effectively blurred. Regardless of the specific implementation, it should be appreciated that the use of an abstraction layer in the execution and recording of automated tests of GUIs can be realized in a variety of ways without departing from the scope of the present discussion.

For instance, in some implementations, abstraction layer 205 can serve as the sole interface between the testing system 105 and a GUI to be tested (or for which an automated test is to be recorded). In such instances, the testing system 105 can execute a test by calling the abstraction layer to perform certain interactions on a GUI element specified in the test by its abstracted logical type and display name. The abstraction layer (e.g., through playback assistance logic 234) can translate the test call into the specific action to be performed on the specific implementation of the GUI element in the GUI code. In the case of test recordings, interactions with a GUI can be observed by the abstraction layer (e.g., using recording assistance logic 236) and converted into the abstracted action to be performed on the logic abstraction of the specific implementation of the GUI element interacted with in the recording.

In other instances, testing system 105 can still interact directly with the GUI (e.g., 262) during testing and recording. For instance, the testing system 105, during execution of a test configured for use with the abstraction layer (e.g., containing references to abstractions of the GUI elements rather than the specific implementations of the GUI elements), can query the abstraction layer to obtain the specific reference to the actual implementation of the specific GUI element under test that corresponds to the logical construct referenced in the test. The testing system 105 can receive information from the abstraction layer 205 in response to the query that allows the testing system 105 to then perform the interaction on the specific implementation of the GUI element. Similarly, in the case of recording, in one example implementation, the testing system 105 can record the interactions with a GUI and pass what it observes to the abstraction layer 205 for the abstraction layer to convert or translate the specific reference to and action performed on the specific implementation of the GUI element into the corresponding logical abstraction of the GUI element as defined in the abstraction layer. The test can be generated from the results returned from the abstraction layer such that the test references the GUI elements by their respective logical abstractions rather than the specific and more volatile implementations of the GUI element in place at the moment of recording, among other potential examples and implementations.

Figure 3:
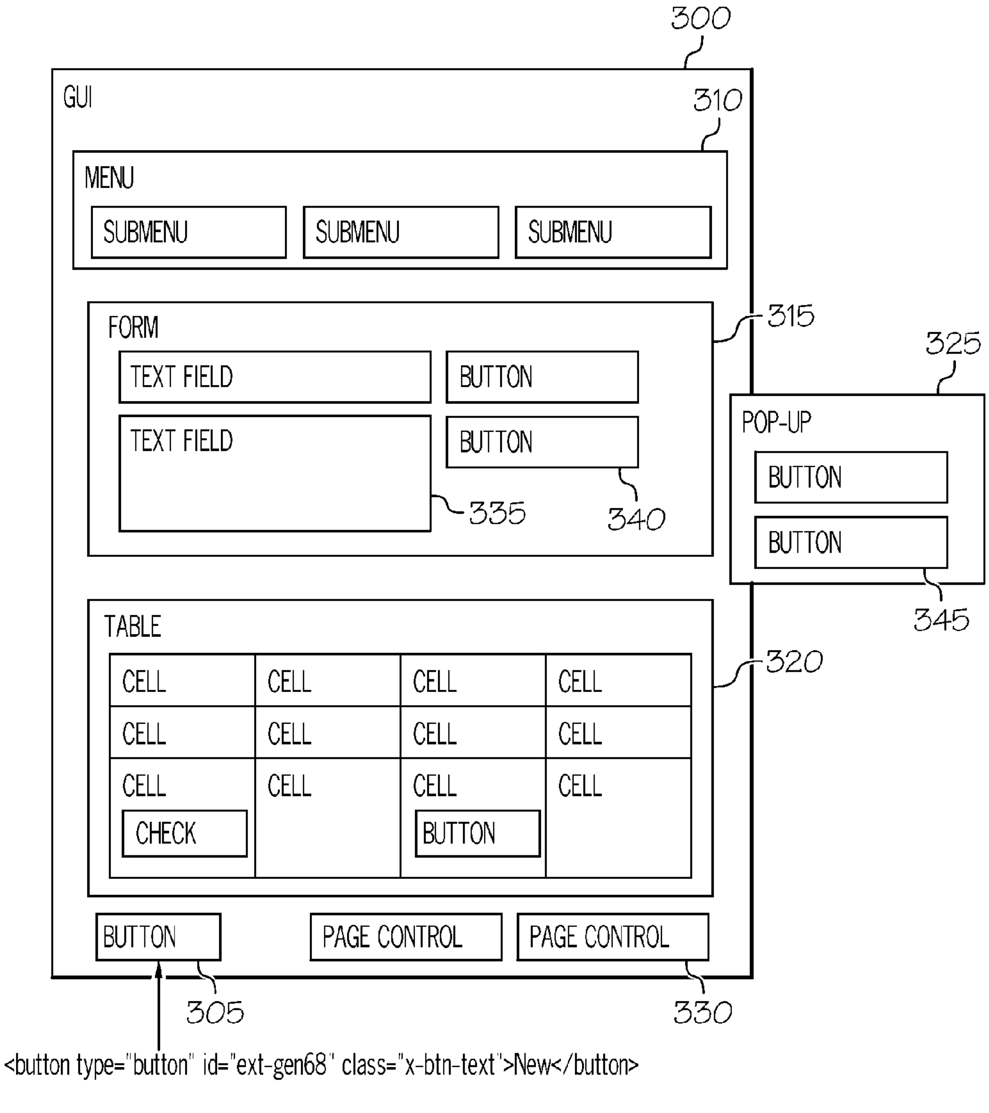
FIG. 3 is a simplified block diagram illustrating an example graphical user interface (GUI) and its constituent GUI elements in accordance with at least one embodiment.

Turning now to the example of FIG. 3, a representation of an example GUI 300 is illustrated, including a variety of GUI elements (e.g., 305, 310, 315, 320, 325, 330, 335, 340, 345, etc.). GUI elements can include, as examples, buttons (e.g., 305, 340, 345, etc.) and other controls (such as check boxes, pagination controls (e.g., 330), etc.), menus (e.g., 310) and submenus, forms (e.g., 315), tables (e.g., 320), pop-up dialogues (e.g., 325), text fields (e.g., 335), drop down menus, auto-fill fields, among other examples. GUI elements can be positioned on a GUI display (or page) according to a defined layout. Further, in some instances, the context in which a GUI element is provided can be hierarchical in that one or more GUI elements are nested within another GUI element. For instance, in the illustrative example of FIG. 3, a form element 315 can include additional elements such as text fields (e.g., 335), buttons (e.g., 340), and the like. Likewise, table elements 320 may include constituent row, column, and cell elements. Indeed, a cell GUI element of a table (e.g., 320) may be considered a child element of a row element, which is a child element of the table element. Further, the cell element may further include other GUI elements, such as a checkbox or button element, as in the example of table 320.

FIG. 3 illustrates logical constructs of various GUI elements. Such logical constructs may map to how human users consider the GUI elements. Rather than identifying a GUI element by the identifier and code utilized by the computing logic that controls and renders the GUI (e.g., 300), a user identifies a button, such as button 305, as a button that may bear a particular name that is displayed in connection with the button corresponding to its designed function, such as "Go", "Search", "Cancel", "Save", or "Edit" button, etc. A GUI abstraction layer can include definitions of the various logical constructs that may exist in a GUI and map each logical construct, or logical GUI element type, to potentially multiple different implementations of that logical GUI element. For instance, a particular type of GUI element may be implemented differently using multiple different languages (e.g., HTML, XHTML, Flash, etc.), using multiple available tags, tools, or options within a single language, or multiple versions of a particular language (e.g., HTML 4.01 and HTML5, etc.). For instance, the specific implementation of GUI element 305 can be an HTML element: "<button type="button" id="ext-gen68" class="x-btn-text">New</button>", where the display name of the button is "New", among a potentially unlimited variety of other examples. The GUI abstraction layer can map a logical construct to each of the various languages and syntaxes that would be employed by one of the potentially multiple alternative implementations of the GUI element thereby serving to at least partially remove the variability of the potential implementations of a particular type of GUI element.

In some instances, a GUI abstraction layer can be custom defined. A set of logical GUI components can be defined that conform to a particular GUI project or design methodology. In some cases, a base GUI abstraction layer can be provided and extended (or consolidated) by a user according to the particular preferences of the user. As the GUI abstraction layer can be used to test interactions with particular categories of GUI elements as well as record such tests, conforming the GUI abstractions to the viewpoint of the persons testing, troubleshooting, and designing the GUI can be useful, among other potential advantages.

Figure 4A:
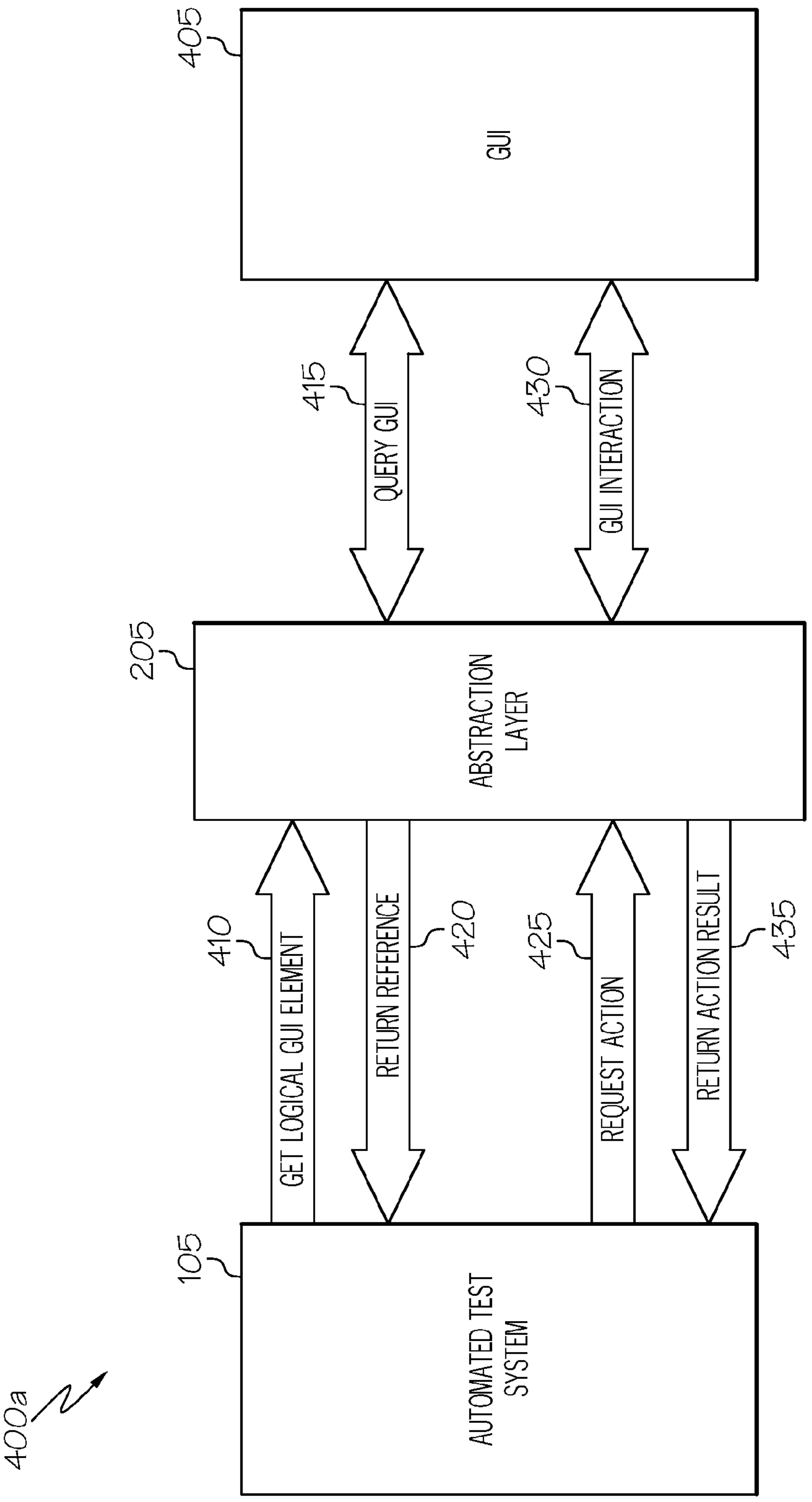
FIGS. 4A-4B are simplified block diagrams illustrating example interactions between an example testing system and abstraction layer in accordance with at least one embodiment.
Figure 4B:
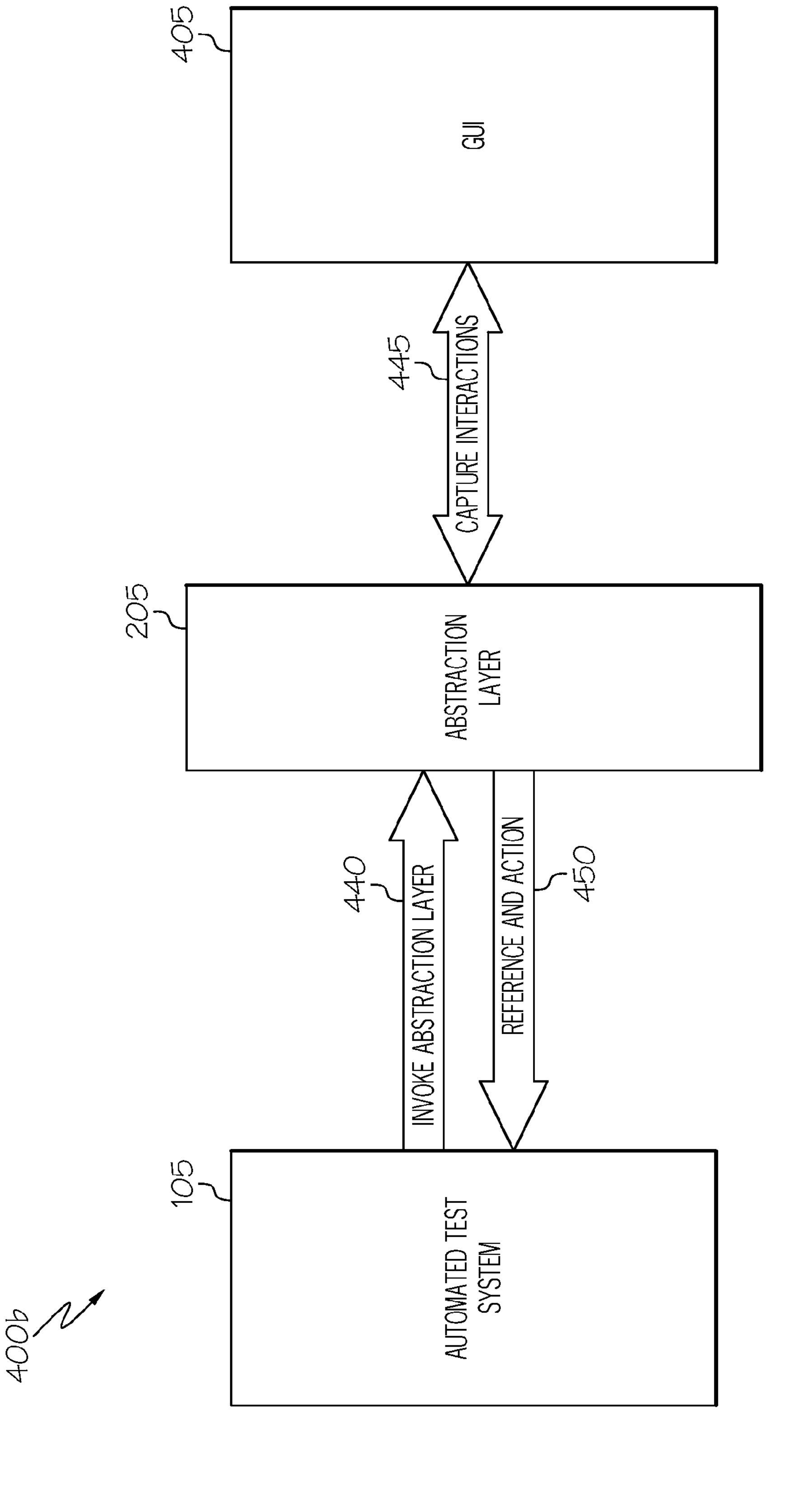

Turning to FIGS. 4A-4B, simplified block diagrams 400*a-b* are shown illustrating an example abstraction layer 205 that can serve as an interface between a testing system 105 and any one of a variety of GUIs (e.g., 405) that may be the subject of a test (or recording of a test). In the example of FIG. 4A, an example test of GUI 405 is to be performed utilizing a predefined test. The test can specify that one or more particular GUI elements of the GUI 405 are to be interacted with. The results of the interaction can then be observed. In one example flow, a test can identify that a particular action (i.e., interaction) is to be performed on a particular GUI element of GUI 405. The test system 405 can read the test and identify the particular GUI element by its abstracted logical construct (or type) and its display name. The test system 405 can send a query 410 to the abstraction layer requesting that the abstraction layer identify the code in GUI 405 corresponding to the requested logical GUI element. The abstraction layer 205 can "query" the GUI (e.g., 415) by identifying the one or more specific implementations of the specified logical GUI element and searching the GUI code 405 for an instance of any of the specific implementations defined in the abstraction layer for that logical GUI element that also possess the display name specified in the query 410. If the abstraction layer 205 identifies the corresponding implementation of the GUI element to be interacted with in the test, the abstraction layer can return 420 a reference to the identified GUI element to the testing system 105.

In the example implementation shown in FIG. 4A, a testing system 105 can obtain a reference identifying or otherwise corresponding to the precise implementation of a request GUI element in GUI and use the reference to request a particular action 425 to be performed on the GUI element. In some instances, the action can be requested in conjunction with the query 410 (e.g., consolidating requests 410, 425 to cause the responsive actions 415, 430 of the abstraction layer), among other potential alternatives. In some cases, the way in which a particular GUI element would be interacted with can be at least partially dependent on the particular implementation of the GUI element. In such cases, the abstraction layer 205 can further abstract types of actions that might be performed (e.g., a click, entry of text, etc.) and map these abstractions to the particular technique to be used by the one or more computing devices performing the test to perform the action specified in the test, among other examples. Further, abstraction layer 205 can include or otherwise access the logic to perform the interaction (e.g., 430) appropriate for the particular implementation of the GUI element identified in the query 415.

Abstraction layer 205, in this particular example, can report the results of the query 415 and/or GUI interaction 430 to the testing system 105 in connection with the testing system's management of the test. In some instances, an interaction with a particular GUI element of a GUI can cause a change in the appearance or behavior of the GUI or a GUI element, such as causing another GUI display to be rendered or for additional content or effects to be applied to the interacted-with or other GUI elements in the GUI. In some implementations, abstraction layer 205 can also be used to identify the precise reactions of various GUI element implementations in GUI 405 and convert these specific responses to abstractions, including abstractions of the specific GUI element to its logical construct and abstractions of the specific response of the GUI element to an abstracted response, among other examples. This abstracted representation of the observed response to the interaction 430 can be returned 435 to the testing system 105. Further, expected responses can be defined for interactions defined in a test that can be compared against the actual responses of the GUI. Such expected responses, in some implementations, can be abstracted to refer to these more generalized, non-implementation-specific constructs, among other examples.

Turning to FIG. 4B, a simplified example is shown of an abstraction layer that is utilized as an interface between testing system 105 and GUI 405 in connection with the recording of a new test of the GUI 405 from real interactions with the GUI 405 and its constituent elements that are recorded with the assistance of abstraction layer 205. For instance, in one example, a testing system 105 can manage the recording of a user's (or system's) live interactions with a GUI 405. The interactions may be real world interactions captured for playback during live operation of a deployed system, or may be interactions deliberately performed to "program" a test that will mimic the interactions performed. In either instance, in this example, testing system can invoke 440 the abstraction layer 205 to perform the recording and interpretation, or translation, of the observed interactions into test steps that make use of the GUI element (and action) abstractions defined in the abstraction layer 205.

The abstraction layer 205 can capture 445 interactions with the GUI and identify the specific code that corresponds to the GUI elements interacted with. The abstraction layer 205 can then search (e.g., prospectively) to identify what logical constructs and contexts map to the specific implementation of the GUI element. The abstraction layer 205 can also identify the display text (or, potentially, image) associated with the GUI element. As some GUI elements may be nested, in that they are provided within the context of another GUI element, identifying the abstraction of the specific GUI element may also include identifying the respective logical abstractions of the parent elements of the GUI element, among other examples. Still further, the abstraction layer 205, in some implementations, can identify the type of interaction performed on the GUI element and map the interaction to a corresponding logical abstraction of the interaction defined in the abstraction layer, among other examples. The abstraction layer 205 can then return 450 these results to the testing system for use in developing a test from the interactions, such as an automated test, that when executed, simulates the recorded actions. The results can include references to the logical constructs identified for the specific GUI elements that were interacted with (including parent elements of the GUI elements interacted with), together with an identification of display names of the element and the action performed, among potentially other information.

Figure 5A:
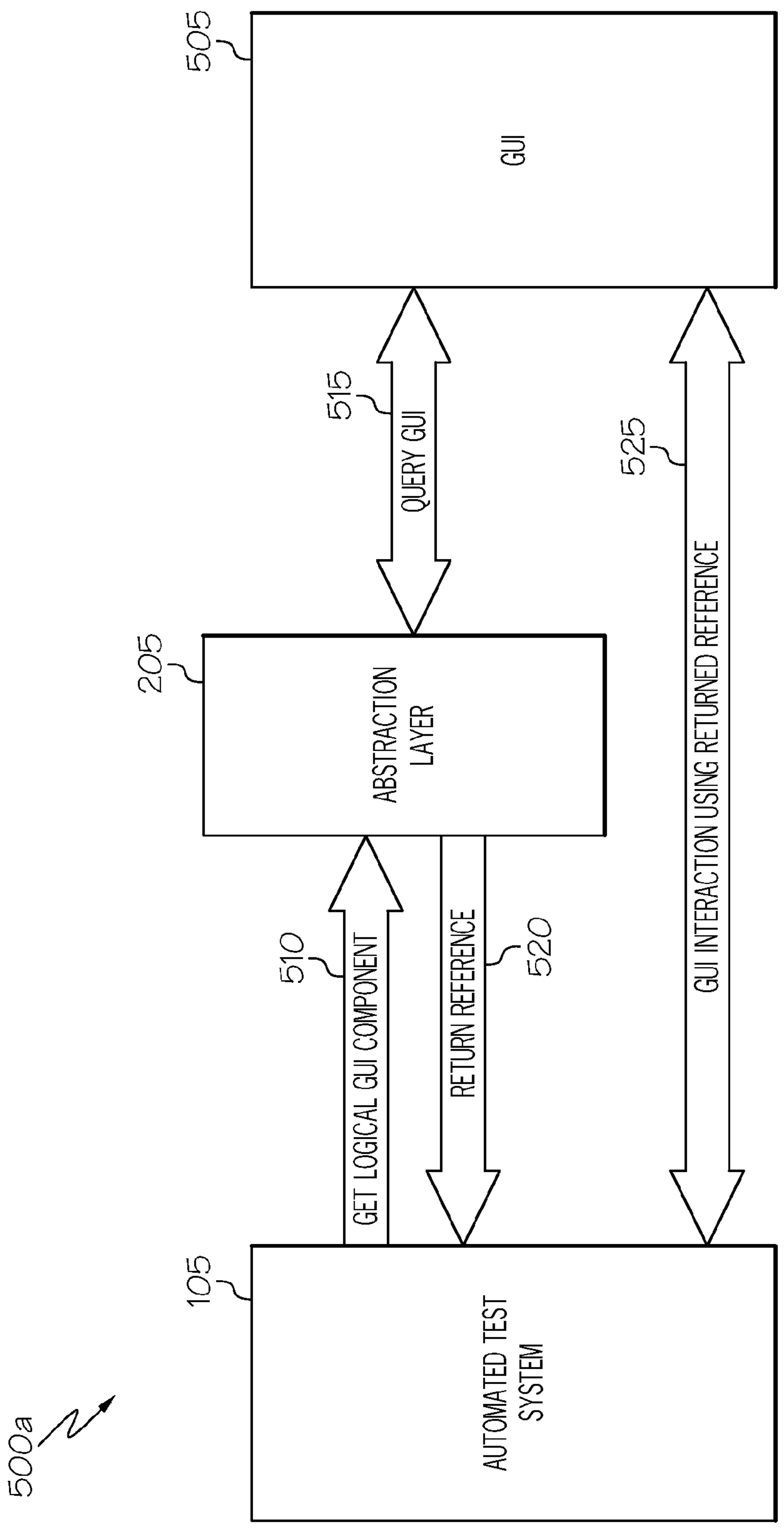
FIGS. 5A-5B are simplified block diagrams illustrating example interactions between an example testing system and abstraction layer in accordance with at least one embodiment.
Figure 5B:
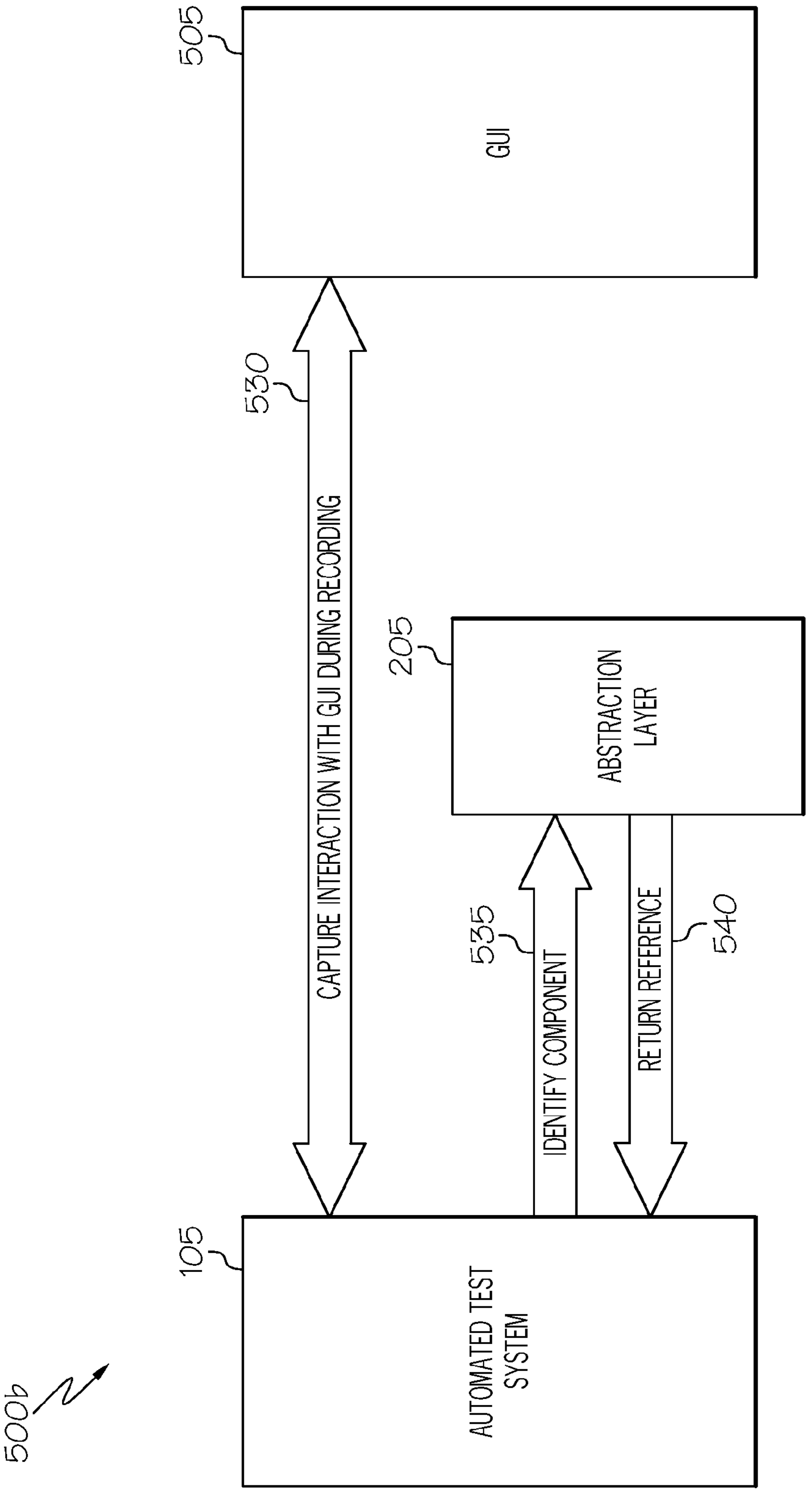

While the abstraction layer 205 in the example of FIGS. 4A-4B served as a substantially complete intermediary between the testing system 105 and the GUI (e.g., 405) to be tested, other implementations, such as those adopting principles of the simplified examples of FIG. 5A-5B may involve a testing system that utilizes more indirect support from the abstraction layer 205. For example, FIG. 5A shows a simplified block diagram 500*a* representing an example test of GUI 505 performed according to a predefined automated test. In this particular example, a testing system 105 executes an automated test that is to simulate user interactions with a GUI 505 and observe the GUI's (and the underlying program's) response to the interactions. The automated test can reference the GUI elements to be interacted with by their logical abstraction, for instance, by an abstract GUI element type and by the name of the GUI element that is to be displayed to the user. To obtain the precise identification of the implementation of this GUI element, the testing system 105 can first query the abstraction layer 205. The abstraction layer 205 can identify one or more potential implementations of such a GUI element type and query the GUI file 505 for instances of any of these potential implementations of the GUI element type, in particular, an instance that includes the identified GUI element display name (e.g., included in query 510). The abstraction layer 205 can identify the particular implementation of the requested GUI element and return a reference 520 to the testing system. The reference can then be used by the testing system 105 to identify and perform 525 a particular action on the specific implementation of the requested GUI element.

In some instances, an example abstraction layer 205 can also map particular implementations of a GUI element with instructions regarding how a set of potential interactions would be performed on each respective implementation of the GUI element. In such instances, the testing system 105 could also query the abstraction layer 205 for the interaction information pertaining to the particular implementation of the requested GUI element type.

In some examples, the testing system 105 can further observe and interpret the responses by the system under test to interactions performed on the system, including interactions with particular GUI elements. In some cases, testing system 105 can query abstraction layer 205 to interpret some of the responses (e.g., of the GUI 505) observed by the testing system 105. For instance, changes to the GUI and GUI elements can be identified and the testing system 105 can query abstraction layer 205 to identify the abstraction(s) of the GUI element(s) as defined in the abstraction layer 205, among other examples.

Turning to the examples of FIG. 5B, a simplified block diagram 500*b* is shown representing use of an abstraction layer 205 by a testing system 105 in the recording of new tests or test steps based on the recording of interactions with the system to be tested. In this particular example, testing system 105 can implement a recorder that captures 530 user (or system) interactions with a GUI of a system to be tested. The testing system 105 can identify the corresponding code that is interacted with during a recording session and corresponds to one or more particular implementations of GUI elements interacted with during the session. In some implementations, tests are to reference GUI elements to be interacted with by their respective abstracted logical constructs as defined in the abstraction layer. This can allow for the tests to survive changes to the GUI for which they were written. Rather than writing a new test when the particular implementation of the GUI (or its elements) changes, the abstraction layer can be amended to reflect the changes, such as through the mapping of an additional specific implementation (e.g., defined in a new version of the GUI language) to an already-defined logical construct of a GUI element defined in the abstraction layer, among other example advantages.

In order to translate these specific implementations into the abstracted logical constructs of the GUI elements that are to be included in tests generated from the recording, the testing system 105 can present (e.g., at 535) the identified implementation of the GUI element that was interacted with to the abstraction layer 205. The abstraction layer 205 can respond 540 to the testing system 105 by identifying the logical construct mapped to the identified implementation of the GUI element. The testing system 105 can then use the returned reference to the logical construct in tests that are to be used in the future to replay the recorded actions on GUI elements of that type (e.g., regardless of the specific implementation that is in place at the time of the test, provided that the specific implementation is also mapped to the corresponding GUI element abstraction defined in the abstraction layer).

In some cases, it can be identified that a specific implementation of a particular GUI element is not mapped to one of the GUI element type abstractions defined by the abstraction layer. In such cases, the abstraction layer 205 can cause an alert to be generated that an abstraction of a particular GUI element has not been defined. This can prompt a user to extend the definition or mapping of a particular logical GUI element type defined in the abstraction layer to include the new, or previously unmapped, implementation of the GUI element.

Figure 6:
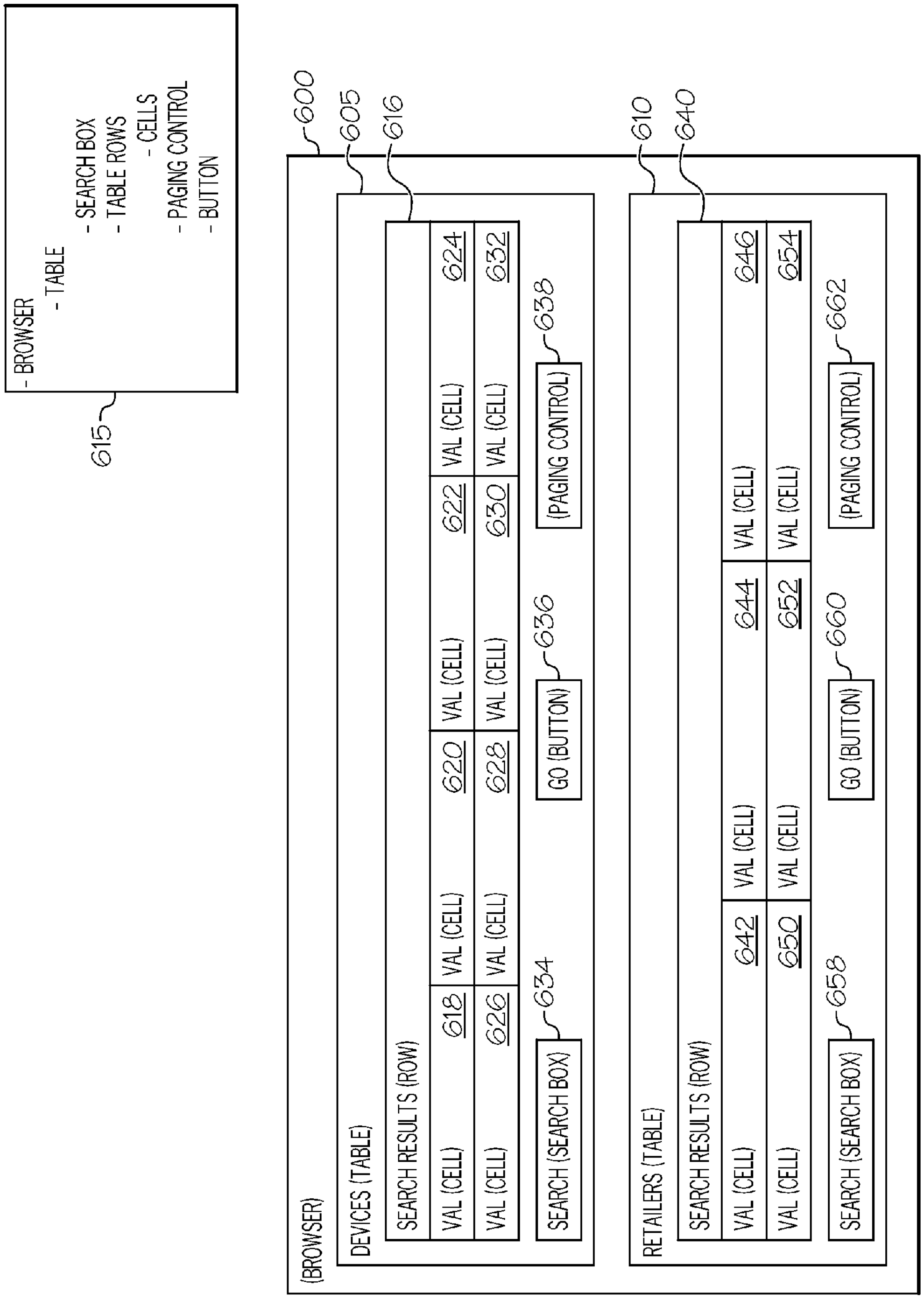
FIG. 6 is a simplified block diagram illustrating an example GUI and its constituent GUI elements in accordance with at least one embodiment.

Turning to FIGS. 6-10, simplified block diagrams are shown to illustrate particular non-limiting examples for purposes of illustrating examples of and expanding upon at least some of the principles described herein. For instance, FIG. 6 illustrates an example GUI 600 implemented as a page, frame, or other view of a webpage for presentation using a browser. This is but one example of a GUI that can be tested and it should be appreciated that the principles described herein for testing and recording tests can be used with GUIs of potentially any form, layout, type or implementation. In this example, the GUI provides multiple search interfaces, one for searching and displaying devices of a particular manufacturer, the other for search and displaying retailers that carry devices of the manufacturer, among other examples. As shown in this example, the GUI 600 can include a variety of GUI elements of various logical GUI types. In this example, GUI 600 includes GUI elements such as tables (e.g., 605, 610), table rows (e.g., 616, 640) that may include constituent table cells (e.g., 618, 620, 622, 624, 626, 628, 630, 632, 642, 644, 646, 650, 652, 654, etc.), input fields (e.g., 634, 658), buttons (e.g., 636, 660), paging control (e.g., 638, 662). An abstraction layer can define a set of logical GUI types. The set can be custom defined. For instance, input fields may often be used for specialized purposes in GUIs and a specialized subset of these types of GUI elements can be defined, such as a search box logical GUI type (e.g., corresponding to search boxes 634, 658). The specific implementations that correspond to each defined logical GUI type can include a custom-defined mapping of implementations to GUI types, among other examples.

As noted above, in some implementations, a testing system (and the automated tests it uses) can refer to GUI elements by their logical type and display name rather than their implementation-specific ID, code, etc., with the abstraction layer responsible for converting these logical references to implementation-specific references. As in the example of FIG. 6, a GUI may include multiple instances of a particular type of GUI element (e.g., search boxes 634, 658 or buttons 636, 660) that each have the same display name (e.g., "Search" and "Go", respectively). A test may distinguish between like-name GUI elements of the same type in the same GUI by context. Such context can be defined, for instance, by identifying the element's unique inclusion or nesting within another GUI element in the GUI or by the order in which the element appears in the GUI code (e.g., the first or second search box with display name "Search", etc.), among other examples. For example, in FIG. 6, search box 634 could be uniquely identified by its specific implementation in the GUI source code, although such references can be vulnerable to volatility in the source code. Instead, the search box 634 can be identified by its logical abstraction (as defined by the abstraction layer) and be differentiated from search box 658 by its inclusion in table "Devices" rather than table "Retailers". In other words, the context of search box 634 is within table "Devices" and the context of search box 658 is within table "Retailers". Context can be hierarchical, as illustrated in the representation of partial hierarchy 615, with the type of GUI (e.g., "browser") being the root context, "table" being a child of "browser", and "search box", "table row" (and "cells"), "paging control", and "button" being children of "table". It should be appreciated that a full version of this hierarchy 615 can include many other types of elements and relationships between elements (e.g., a form field that can also include child elements such as text fields, buttons, etc., among many other potential examples).

Figure 7:
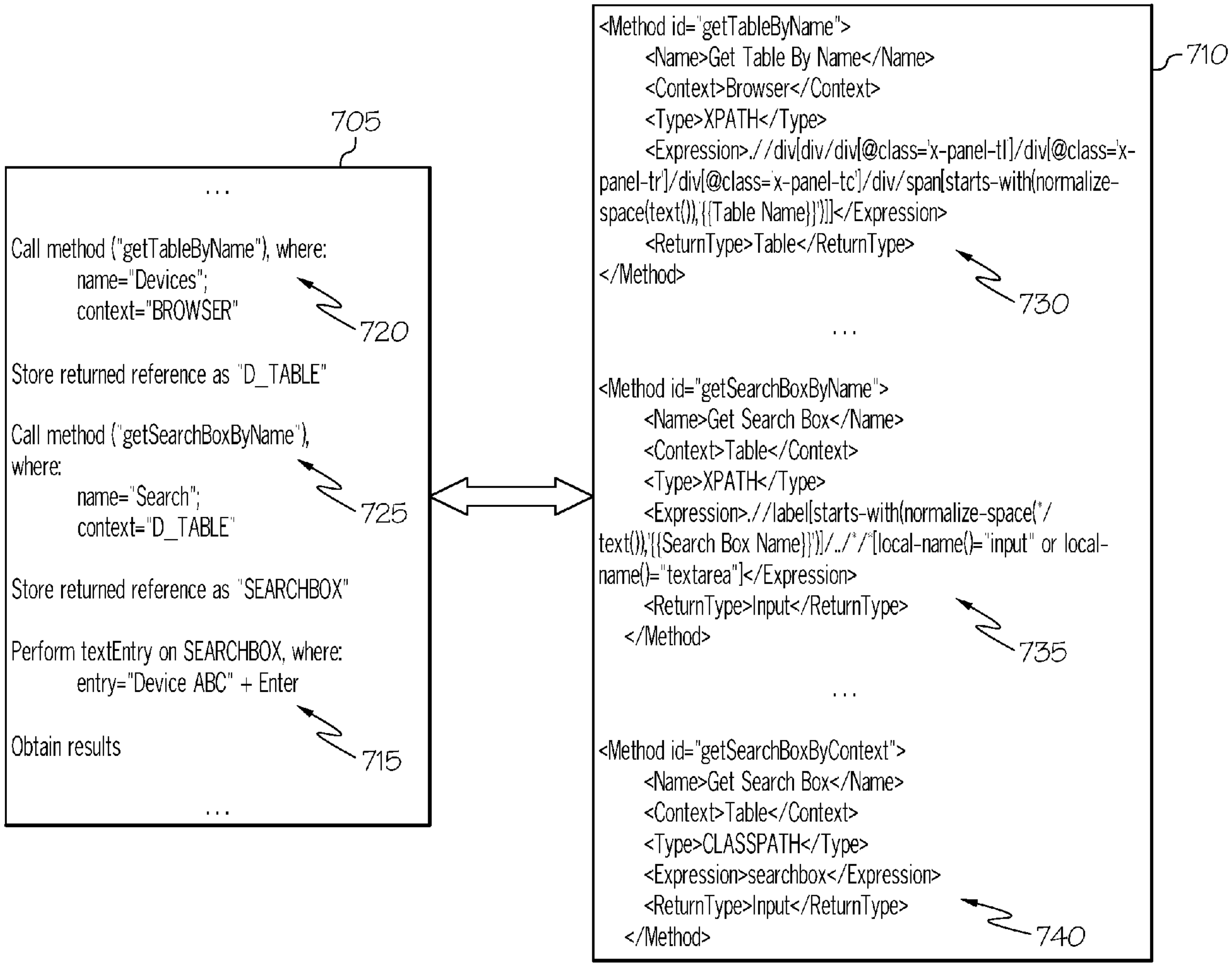
FIG. 7 represents an example automated test for use in testing versions of the example GUI of FIG. 6 and further represents a portion of an example abstraction layer methods in accordance with at least one embodiment.

Turning to the example of FIG. 7, pseudocode 705 corresponding to an example automated test of a system that includes interactions with a particular GUI of the system is illustrated. Also illustrated in FIG. 7 is a portion of an example abstraction layer definition 710 that can be used in connection with the portion of the test represented by pseudocode 705. In the example of FIG. 7, the test is a test of GUI 600, to which the example abstraction layer definition 710 can also apply. The test, in providing for interactions with GUI 600, can call one or more methods to cause the abstraction layer to be queried to return a reference to the particular implementation of a corresponding GUI element to be interacted with. For instance, in the particular example of FIG. 7, a query can be made of the abstraction layer by identifying the logical GUI element type, display name, and context of a particular GUI element to be interacted with. In this example, the test is to interact with search box 634 by entering a search term "Device ABC" (e.g., at 715). The test can be constructed to consider the context in which the search box 634 is provided for in the GUI, namely that the search box is included within another GUI element, Devices table 605. Accordingly, the test can be generated to step down through the hierarchy, or nesting, of elements in the GUI until it reaches the targeted GUI element (e.g., search box 634).

In the particular example of FIG. 7, a reference to the targeted GUI element, search box 634, is obtained by first obtaining a reference to its parent GUI elements (e.g., Devices table 605). Accordingly, a method can be called (at 720) that identifies specific implementations of a "Table" logical GUI element type by display name. The method can be provided the display name ("Devices") and the context in which the table element is provided in the GUI (at the root level, or "Browser"). Calling the method "getTableByName" of the abstraction layer (e.g., at 730) can cause the GUI 600 to be queried for code that matches or substantially matches an expression defining what specific implementations of table GUI elements are included in the "Table" logical GUI element type. While in some examples, the query can search for any of multiple, different implementations, in this example, a single implementation is searched for. Proprietary or pre-existing query schemes can be used to search the GUI 600 for the presence of the GUI element and the syntax of the expression can be based on the query scheme employed. Indeed, multiple different query schemes can be employed and supported by a single abstraction layer, with different query schemes used to search for different GUI elements or conduct additional searches for the same GUI element (e.g., when a first type of search is unsuccessful), among other examples. For instance, in the example of FIG. 7, an XPATH query can be specified and utilized (e.g., in the expression) to search the GUI for a table including the name "Devices." The method "getTableByName" can return a reference to the specific implementation of the Devices table 605 identified in the GUI 600.

The reference returned by an abstraction layer method can take a variety of forms. In some cases, the abstraction layer can identify the location of the GUI code corresponding to the specific implementation of the queried-for GUI element, as well as, in some instances, a copy of the code, among other examples. In some implementations, a corresponding object or other piece of code corresponding to the GUI element can be wrapped in the response with a label corresponding to the type of GUI element sought for in the method call. For example, in response to "getTableByName" an HTML object can be wrapped in the response and labeled as belonging to the "Table" context and returned to the testing system. Further, in instances where the method call results in no matching GUI elements being found, the method can return an empty set, error, or other message that can communicate the condition to the testing system.

Continuing with the example of FIG. 7, the results of the abstraction layer query can be stored (e.g., in a variable "D_TABLE") for use as the context in a subsequent method call or a call to perform an action on that object (i.e., the specific implementation of the queried GUI). For instance, a second method can be called (at 725) to identify the specific implementation of the search box that is included in the GUI element ("Devices" table 605) referenced by the context variable "D_TABLE" and that bears the display name "Search". In response, the "getSearchBoxByName" abstraction layer method (at 735) can be executed to return a reference to the specific implementation of search box element 634. The test can then specify an action (at 715) to be performed on the returned SEARCHBOX object identified through the getSearchBoxByName. In this case, the action 715 includes the entry of text "Device ABC" and an Enter keystroke. The test can then obtain the response of the software under test resulting from the interaction.

While in the example above, a "getSearchBoxByName" method was specified that identified the logical GUI type to be queried and a display name (and, optionally, a context) of the target object, in some cases, a GUI element may not have a display name. In such instances, an alternate method can be used to return a reference to the GUI element. For instance, in the case of a search box (e.g., lacking a display name), a "getSearchBoxByContext" method 740 can be called. The "getSearchBoxByContext" method 740 can return the same results as method 735 utilizing the context of the "Devices" table to identify the (only) search box element included in that context, among other potential examples.

Figure 8:
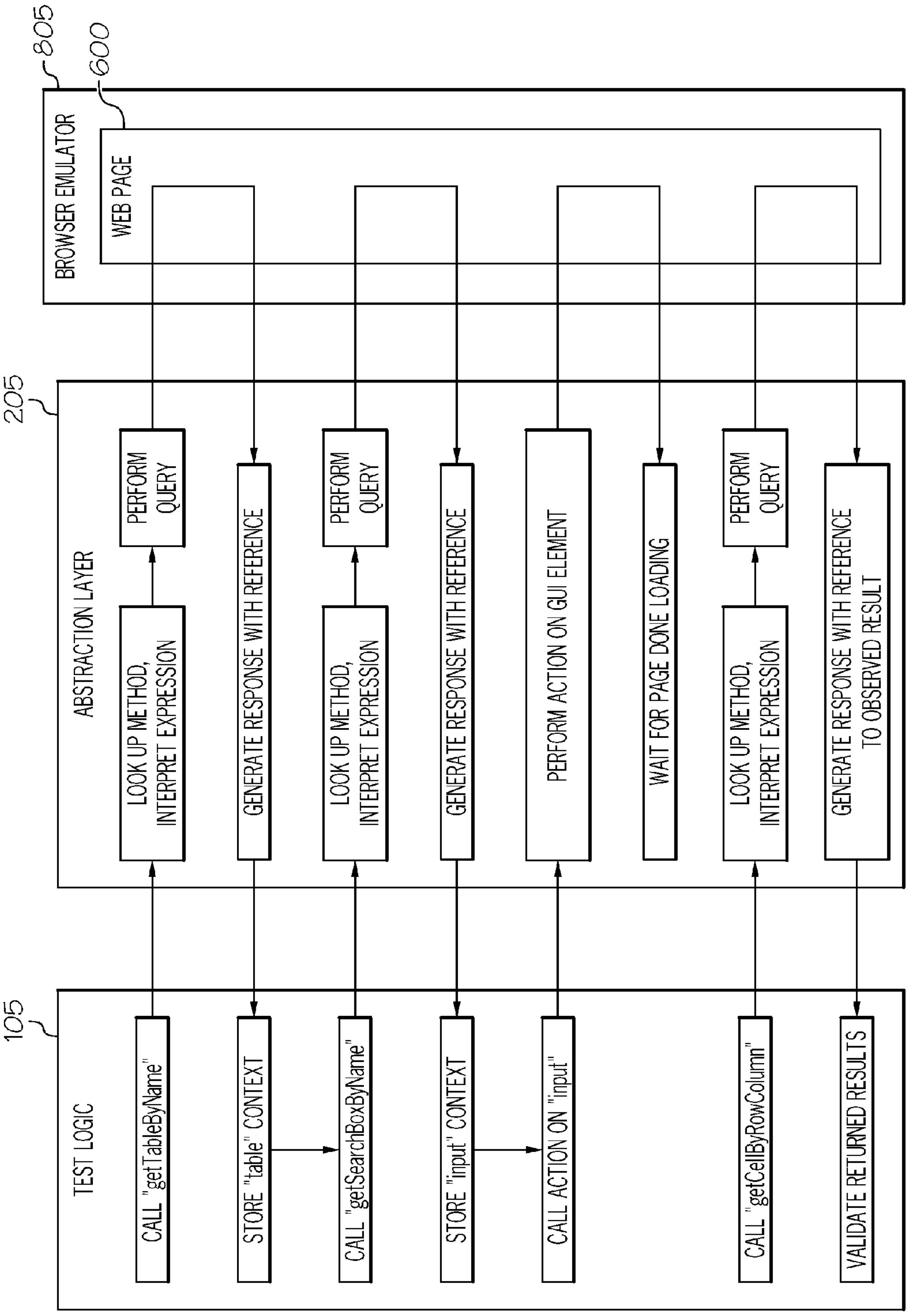
FIG. 8 is a simplified block diagram illustrating example interactions between an example testing system and abstraction layer in accordance with a test of a version of the example GUI of FIG. 6 in accordance with at least one embodiment.

FIG. 8 is a simplified flow diagram illustrating an example flow of the execution of an example test (e.g., similar to that corresponding to pseudocode 705 in FIG. 7 above). As in the example of FIG. 7, in FIG. 8 test logic (e.g., of a testing system 105) can execute a test including calls to abstraction layer methods that correspond to interactions with a GUI of the software under test. In this particular example, a search box embedded within a table element can be accessed and identified by progressing through a hierarchy of contexts (e.g., 615) to the search box logical GUI element type. Access the targeted search box can involve first identifying the table in which the search box is embedded by calling a "GetTableByName" abstraction method. The abstraction layer 205 can receive the request and lookup the method and interpret the expression, including values within the expression, such as the display name and parent context of the table, among other examples. Further, the abstraction layer 205 can determine how to query (e.g., which query scheme to use) the GUI under test. In the example of FIG. 8, the GUI 600 is implemented as a webpage to be rendered on a browser. In this particular example, a testing system can run and record tests through a browser emulator system 805, such that multiple different browsers can be tested, additional test assistance functionality provided, among other potential features and advantages.

The abstraction layer 205 can perform a query of a webpage rendered through the browser emulator 805 according to the "getTableByName" method call received from the test logic. The abstraction layer 205 can obtain results of the query and generate a response that references the specific implementation of the requested table. The reference can be returned to the test logic to be stored, for instance, as a context variable for the parent "table" context of the targeted search box. As in the example of FIG. 7, the test logic can further execute the test and utilize the "table" context reference received as a response of the abstraction layer 205 to specify the context of the search box (e.g., the particular table in which the search box is located) in a subsequent method call to "getSearchBoxByName". The abstraction layer 205 can again process the method and inputs (e.g., the context and display name of the requested GUI element of logical type "search box") and interpret the expression associated with the called method. The abstraction layer 205 can perform a query of the GUI 600 based on the expression to identify the specific implementation of the targeted search box GUI element. A response can again be generated by the abstraction layer 205 and returned to the test logic.

With the reference provided to the test logic, the test logic can store the returned reference as the context for an interaction that is to be performed on the targeted GUI element. In this particular example, the test logic can utilize the abstraction layer to perform at least a portion of the action on the targeted GUI element. For instance, the test logic can call a method with the reference to the specific implementation of the targeted GUI element as an input. The method call may identify the action to be performed on the targeted GUI element, such as through a variable specifying one of a plurality of available actions or through the method being one of a plurality of methods each dedicated to performing a particular type of action, among other examples. The abstraction layer 205 can receive the interaction method call and cause the corresponding action to be performed on the targeted GUI element of GUI 600 specified in the reference included in the interaction method call. The GUI can respond to interactions performed on it in connection with a test. In some cases the response can result in changes to the GUI 600. For example, as illustrated in FIG. 6, the "Devices" table 605 can include rows of cells (e.g., 618, 620, 622, 624, 26, 628, 630, 632) in which search results are presented in response to queries entered through search box 634. Accordingly, if the test is simulating the entry of search terms in search box 634, it may be expected that a set of search results will be returned and populate the rows and cells of table 605. In the example of FIG. 8, testing logic may further utilize abstraction layer 205 to collect the results of the interaction with the targeted search box GUI element. For instance, the testing logic may call a method to obtain references to the table's cells (e.g., to identify where to find the results in the GUI). Accordingly, a "getCellByRowColumn" method may be called identifying one or more columns of interest to the test in the table. The "getCellByRowColumn" method may also identify the context of the cells to be referenced by the query, such as by identifying the table in which the results are to appear. Because this context has already been obtained (and stored in a "table" context variable), another call to "getTableByName" may be avoided. The abstraction layer 205 can again interpret and process the method call and perform a query of the GUI (i.e., following the interaction with the search box GUI element). The abstraction layer 205 can then send a reference to the cell(s) of interest which the testing system can then use to obtain and/or validate the results of the interaction as defined in the test.

Figure 9:
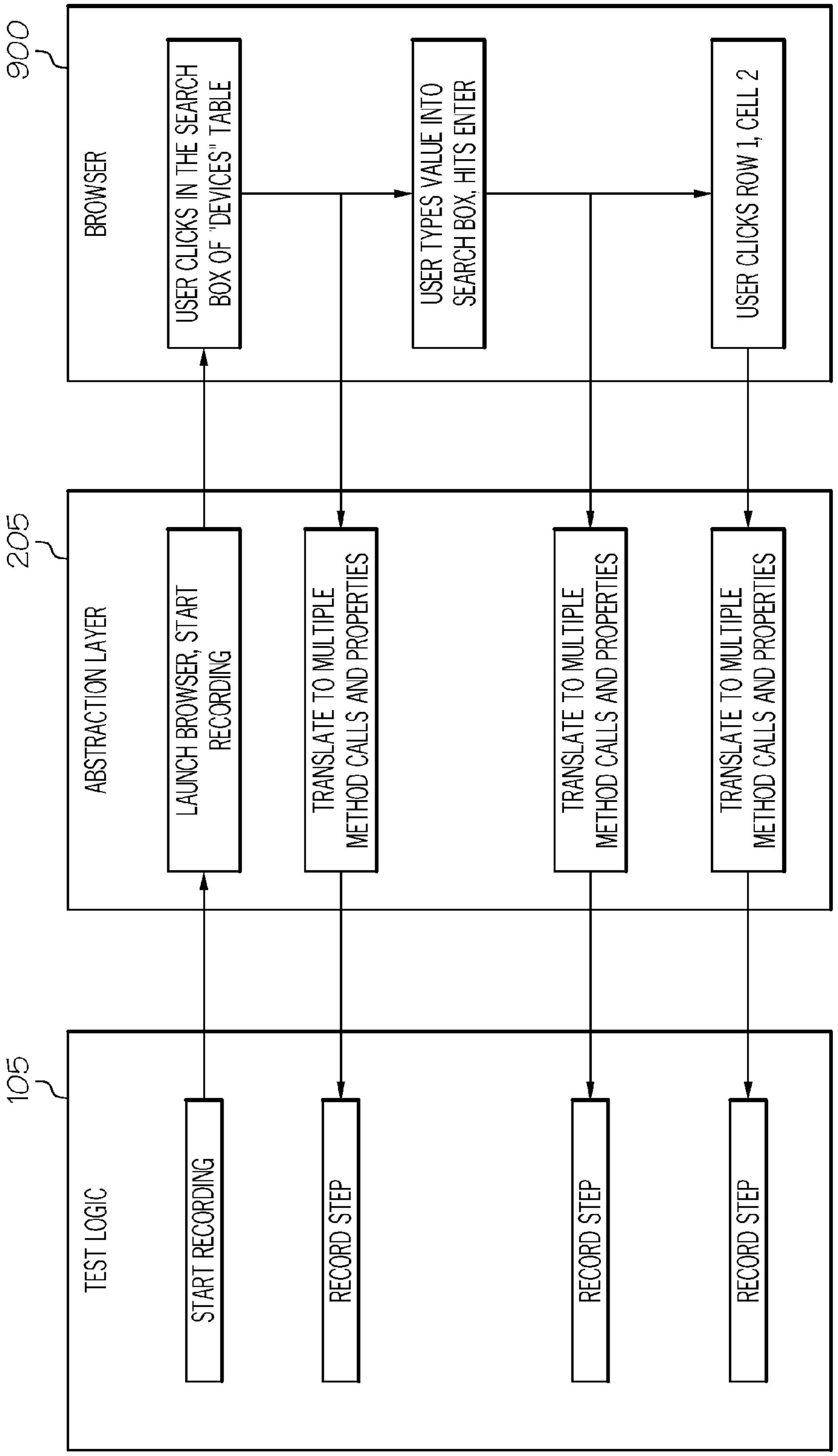
FIG. 9 is a simplified block diagram illustrating example interactions between an example testing system and abstraction layer in accordance with recording example interactions with a GUI for use in generating a test in accordance with at least one embodiment.

Turning now to FIG. 9, an abstraction layer can also be queried in connection with the recording of new tests involving a GUI, such that recorded interactions with specific implementations of various GUI elements can be translated into references to actions performed on the logical GUI type abstractions defined in the abstraction layer and corresponding to those particular GUI elements interacted with in the recording. In instances where the interacted-with GUI element is nested within one or more layers of other GUI elements, the abstraction layer can not only identify the logical GUI type of the interacted-with GUI element, but also its context. Identify the context of a nested GUI element can also include determining, for each layer (or parent) above the interacted-with GUI element, the respective logical GUI type. As illustrated, for instance, in the example of FIG. 7, a test can make calls to an abstraction layer for the contexts of the parent elements of targeted child elements. Creating such a test can thus include deriving what method calls to make, or more generally, identifying which logical GUI types are to be queried in the test in order to obtain the proper context of and identify the targeted GUI element.

In the example of FIG. 9, testing logic (e.g., 105) can manage the recording of a test and cause the recording to start. The abstraction layer 205, in this particular example, can provide the interface between the testing system and the GUI (rendered using browser 900) and launch the browser. A user may navigate to a particular page or view of the GUI and the page can be regarded as a root or parent context for all interactions with GUI elements in that particular page. In one example, a user, during recording, may navigate to GUI 600 and click in the search box of "Devices" table (e.g., 605) to enable a cursor in the search box. The selection of the search box can be identified by the abstraction layer 205 and the abstraction layer 205 can identify the particular implementation of the search box and translate the particular implementation of the GUI element into a hierarchy of contexts and a corresponding set of method calls that would be used in a test to replay the recorded selection of the particular GUI element. For instance, if search box 634 is selected, the abstraction layer can identify that search box 634 is a child of table 605 in the GUI 600. Accordingly, the abstraction layer can further identify that to access the particular implementation of the search box using logical constructs defined in the abstraction layer 205, a "getTableByName" method would first be called followed by a "getSearchBoxByContext" method using the reference to the parent table returned by the "getTableByName" method. The abstraction layer 205 can further identify, and in some cases, abstract the action or action type performed on the particular GUI elements, among other examples.

In some cases, translation of actions performed on specific implementations of various GUI elements in a recording can be translated into corresponding logical constructs in real time, as the actions are identified. In other instances, the recorded actions can be referenced in post-processing to later translate (and consolidate) the recorded actions into their respective logical constructs. These translation results can be passed to the testing system 105 to generate an automated test capable of recreating the recorded interactions and doing so through references to the abstracted logical constructs of the GUI elements interacted with during the recording, rather than the specific implementations of the interacted-with elements.

Figure 10:
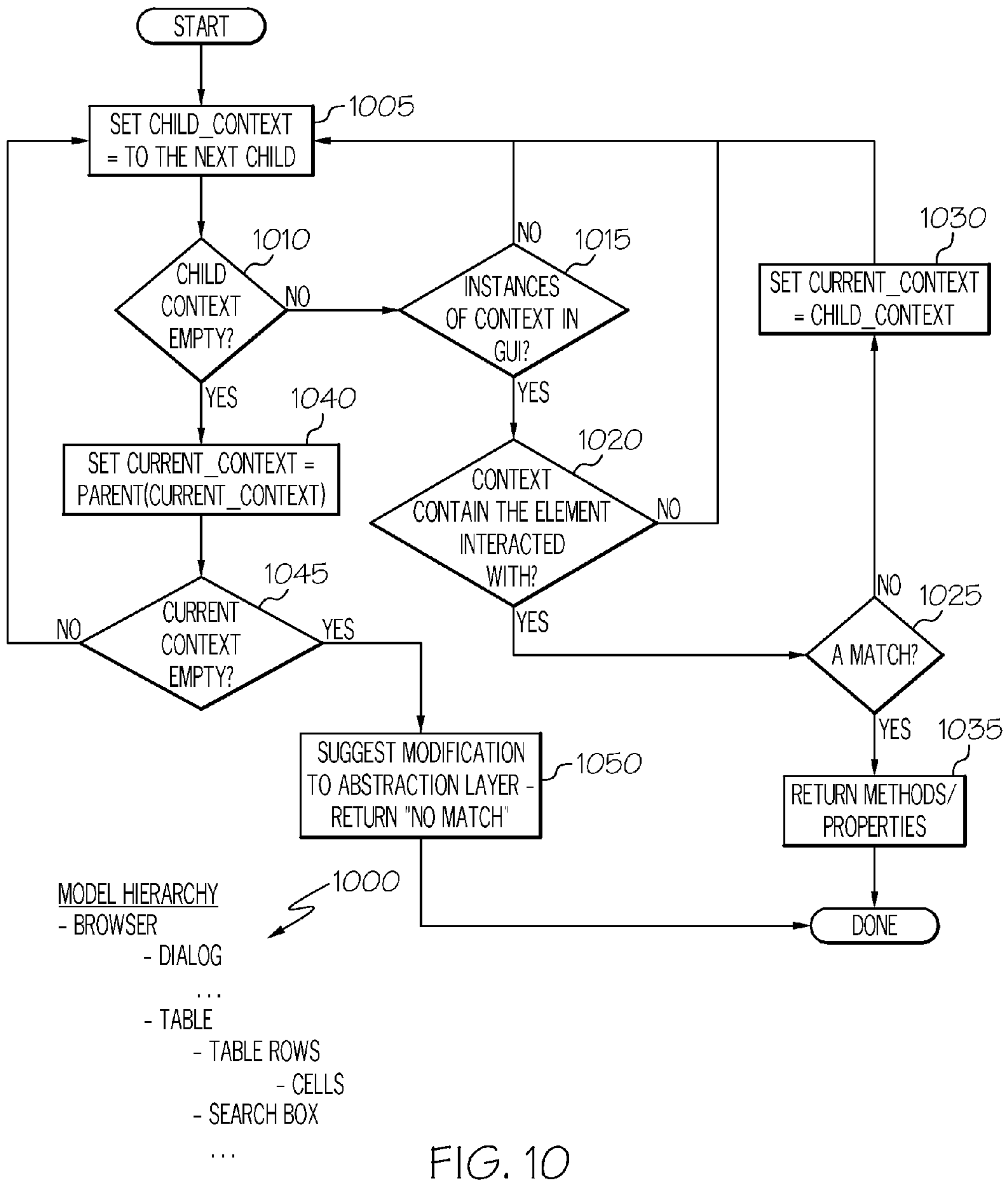
FIG. 10 is a simplified flowchart illustrating an example technique for querying abstraction layer definitions to determine an abstracted type of GUI element defined in the abstraction layer corresponding to a particular GUI element in accordance with at least one embodiment.

In some cases, a recursive search can be performed within the abstraction layer to translate an interaction with a particular implementation of a GUI element into its respective logical construct and context(s) (e.g., logical constructs of the GUI element's parent elements). In the example of FIG. 10, a simplified flow diagram is shown illustrating an example algorithm to translate a reference to a specific implementation of a particular GUI element into a corresponding construct of the logical GUI type (e.g., for reference in a test of the particular GUI element). A particular implementation of a GUI element can be identified as a target element to be interacted with in a test. The context of the GUI element can be determined recursively by proceeding from a top level, or root, of a context hierarchy 1000 downward.

In some cases, a CURRENT_CONTEXT can initially be set to the root context within hierarchy 1000, in this case, the "Browser" context, or the context representing the entirety of a particular GUI page or view. Using the example of FIG. 6 as a reference in this discussion, the particular GUI page can be GUI 600. The first child defined under the CURRENT_CONTEXT, in this case "Dialog", can be set (at 1005) as the current CHILD_CONTEXT. If there are no other child contexts of the current context, the child context is empty (e.g., as determined at 1010). In this case, there are at least two immediate children below "Browser" in the hierarchy, namely "Dialog" and "Table", so the child context of "Browser" is not empty. It can then be determined (at 1015) whether there are instances of the child context "Dialog" in the GUI 600. In this example, GUI 600 does not include an instance of the "Dialog" logical GUI type, or context, and processing returns to block 1005 to set the CHILD_CONTEXT from "Dialog" to "Table". It is further determined (at 1015) that there are two instances (e.g., 605, 610) of the "Table" GUI type, or context, as defined in the abstraction layer, within the GUI 600. It can then be determined (at 1020), for each of the identified instances, whether the specific context (e.g., 605 or 610) includes the element (e.g., search box 634) that is to be interacted with (e.g., as identified in a recording of interactions with the element). For contexts (e.g., elements of the logical "Table" type (e.g., table 605)) that were identified as containing the interacted-with element (e.g., 634), it is further determined (at 1025) whether the context is the interacted-with element (e.g., is a match). In the example of GUI 600, table 605 is determined (at 1020) to contain the element, but is determined not to be, or match, the element (at 1025). Accordingly, table 605 can be designated as the CURRENT_CONTEXT (at 1030) by virtue of it containing the targeted GUI element (e.g., 634). Processing can return to block 1005 where the children of the table 605 context are tested in succession to determine (at 1015 and 1020) whether they are included in the GUI and whether they contain the interacted-with GUI element. The "Table Row" context is first designated as CHILD_CONTEXT and tested. Because the table rows of table 605 do not contain GUI element 634, processing passes from 1020 again to 1005 where "search box" is first designated as CHILD_CONTEXT and tested. It is determined (at 1015) that an instance (e.g., 634) of a qualifying "search box" logical GUI element type (as defined in the abstraction layer) is included in GUI 600 and further determined that search box 634 "contains" the interacted-with component. Indeed, at 1025, it is determined that search box 634 is the interacted-with component and methods and properties corresponding the search box 634 and its parent elements (e.g., "Devices" table 605) are returned 1035.

In some instances, a recording of interactions with a GUI to be tested may involve interactions with components that have not yet been defined with or mapped to an already defined logical GUI element type in the abstraction layer. For instance, in the example algorithm of FIG. 10, each context defined in a hierarchy 1000 of GUI element types defined in an abstraction layer can be tested (e.g., at 1015, 1020, 1025, etc.) without identifying the interacted-with element (or one or more of its parent elements) as an instance of an already defined logical element type. Eventually, the hierarchy 1000 of GUI element types can be exhausted and it can be determined (at 1010) that the child contexts for the CURRENT_CONTEXT are empty. The algorithm can attempt to identify (at 1040) a still higher parent in the hierarchy. However, if no higher contexts are determined (at 1045) to exist (e.g., where the CURRENT__CONTEXT is the root context (e.g., "Browser")) the current context is considered empty. Exhausting the defined GUI element types without finding a match for the interacted-with GUI element can cause a "no match" result to be returned (at 1050). Further, in some instances, feedback data can be returned with the "no match" result to assist administrators in expanding the abstraction layer definitions and methods to include the interacted-with GUI element that did not match one of the contexts of the abstraction layer. For instance, the feedback data can identify the parent contexts of the interacted-with GUI element and suggest the definition of a new child context of these parents or the expansion of an existing child context of these parents, such that the interacted-with GUI element is successfully mapped to a context defined in the abstraction layer, among other examples.

While the foregoing examples described particular implementations of an abstraction layer, it should be appreciated that the principles herein can apply to any implementation of an abstraction layer abstracting specific implementations of various GUI elements into defined logical GUI element types. For instance, portions of another example of an abstraction layer definition is shown below in Table 1:

TABLE 1

Example Abstraction Layer Methods

```
<Method id="getReorderControlByClassType">
  <Name>Get Reorder Control</Name>
  <Context>Dialog</Context>
  <Type>CLASSNAME</Type>
  <Expression>x-grid3-body</Expression>
  <ReturnType>ReorderControl</ReturnType>
</Method>
<Method id="getReorderItemByRowIndex">
  <Name>Get Reorder Row By Index</Name>
  <Context>ReorderControl</Context>
  <Type>XPATH</Type>
  <Expression>.//*[contains(normalize-space(@class),'x-grid3-row')][{{Row
Index}}]</Expression>
  <ReturnType>ReorderControlItem</ReturnType>
</Method>
<Method id="getButtonByText">
  <Name>Get Button By Text</Name>
  <Context>*</Context>
  <Type>XPATH</Type>
  <Expression>//button[normalize-space(text( ))='{{Button Text}}]'</Expression>
  <ReturnType>Button</ReturnType>
</Method>
<Method id="getDialogByClass">
  <Name>Get Dialog</Name>
  <Context>Browser</Context>
  <Type>CLASSNAM E</Type>
  <Expression>dialog</Expression>
  <ReturnType>Dialog</ReturnType>
</Method>
<Method id="getInputBoxByName">
  <Name>Get Input Box By Name</Name>
  <Context>Browser</Context>
  <Context>Dialog</Context>
  <Context>FormSet</Context>
  <Type>XPATH</Type>
  <Expression>.//label[starts-with(normalize-space(*/text( ));'{{Name}}') OR starts-
with(normalize-space(text( ));'{{Name}}')]/../*/*[local-name( )="input" OR local-
name( )="textarea"]</Expression>
  <ReturnType>Input</ReturnType>
</Method>
<Method id="getCheckBoxByName">
  <Name>Get Check Box By Name</Name>
  <Context>Browser</Context>
  <Context>Dialog</Context>
  <Context>FormSet</Context>
  <Type>XPATH</Type>
  <Expression>.//label[starts-with(normalize-space(text( )),
'{{Name}}']/../input</Expression>
  <ReturnType>Checkbox</ReturnType>
</Method>
<Method id="getRequiredInputBoxByName">
  <Name>Get Required Input Box By Name</Name>
  <Context>Browser</Context>
  <Context>Dialog</Context>
  <Context>FormSet</Context>
  <Type>XPATH</Type>
  <Expression>.//label/span[starts-with(normalize-space(text( )),
```

TABLE 1-continued

Example Abstraction Layer Methods

```
'{{Name}}']/../../*/input</Expression>
    <ReturnType>Input</ReturnType>
</Method>
    <Method id="getFieldSetByName">
    <Name>Get Form Fieldset By Name</Name>
    <Context>Browser</Context>
    <Context>Dialog</Context>
    <Type>XPATH</Type>
    <Expression>.//fieldset/legend/span[starts-with(normalize-space(text( )),
'{{Name}}']/../..</Expression>
    <ReturnType>FormSet</ReturnType>
</Method>
<Method id="getListItemByName">
    <Name>Get List Item By Name</Name>
    <Context>FormSet</Context>
    <Type>XPATH</Type>
    <Expression>.//dl/dt/em[starts-with(normalize-space(text( )), '{{Name}}')]</Expres-
sion>
    <ReturnType>FormSet</ReturnType>
</Method>
<Method id="getDropDownBox">
    <Name>Get Dropdown Box By Name</Name>
    <Context>Browser</Context>
    <Context>Dialog</Context>
    <Context>FormSet</Context>
    <Type>XPATH</Type>
    <Expression>.//label/span[(starts-with("{{Name}}", normalize-space(substring-
before(text( ),"..."))) and contains(text( ), "...")) or starts-with(normalize-space(text( )),
"{{Name}}") ]/../../*/*/input[@type='text']</Expression>
    <ReturnType>ComboBox</ReturnType>
</Method>
<Method id="getDropDownBoxOption">
    <Name>Get Dropdown Box Option</Name>
    <Context>Browser</Context>
    <Type>XPATH</Type>
    <Expression>.//div[contains(normalize-space(@class),'x-combo-list-item') and starts-
with(normalize-space(text( )),'{{Name}}')]</Expression>
    <ReturnType>ComboBoxItem</ReturnType>
</Method>
<Method id="getInputBoxBelowName">
    <Name>Get Input Box Below Name</Name>
    <Context>Browser</Context>
    <Context>Dialog</Context>
    <Type>XPATH</Type>
    <Expression>.//label/span[starts-with(normalize-space(text( )),
'{{Name}}']/../../div/input</Expression>
    <ReturnType>Input</ReturnType>
</Method>
<Method id="getDivByContents">
    <Name>Get Div by Contents</Name>
    <Context>Browser</Context>
    <Context>Dialog</Context>
    <Type>XPATH</Type>
    <Expression>.//div[contains(normalize-space(text( )), '{{Name}}')]</Expression>
    <ReturnType>Table</ReturnType>
</Method>
<Method id="getSpanByContents">
    <Name>Get Span by Contents</Name>
    <Context>Browser</Context>
    <Context>Dialog</Context>
    <Type>XPATH</Type>
    <Expression>.//span[contains(normalize-space(text( )),'{{Name}}')]</Expression>
    <ReturnType>Table</ReturnType>
</Method>
<Method id="getDivById">
    <Name>Get Div by ID</Name>
    <Context>Browser</Context>
    <Context>Dialog</Context>
    <Type>XPATH</Type>
    <Expression>.//div[@id='{{Name}}']</Expression>
    <ReturnType>Table</ReturnType>
</Method>
<Method id="getSpanById">
    <Name>Get Span by ID</Name>
    <Context>Browser</Context>
    <Context>Dialog</Context>
```

TABLE 1-continued

Example Abstraction Layer Methods

```
    <Type>XPATH</Type>
    <Expression>.//span[@id='{{Name}}']</Expression>
    <ReturnType>Table</ReturnType>
</Method>
<Method id="getGearMenuForViewName">
    <Name>Get Gear Menu for View Name</Name>
    <Context>Browser</Context>
    <Context>Dialog</Context>
    <Type>XPATH</Type>
    <Expression>.//span[contains(normalize-space(text( )),
'{{Name}}']/../div[contains(normilize-space(@class), 'x-tool-gear')</Expression>
    <ReturnType>Table</ReturnType>
</Method>
<Method id="getItemByNameFromPopupMenu">
    <Name>Get Item By Name From Popup Menu</Name>
    <Context>Browser</Context>
    <Type>XPATH</Type>
    <Expression>.//div[contains(normalize-space(@class),'x-menu') and contains(normalize-
space(@style),'visible')]/ul/li/a/span[normalize-space(text( ))='{{Name}}']</Expression>
    <ReturnType>Table</ReturnType>
</Method>
<Method id="getItemByNameFromComboList">
    <Name>Get Item By Name From Combo List</Name>
    <Context>Browser</Context>
    <Type>XPATH</Type>
    <Expression>.//div[contains(normalize-space(@class),'x-combo-list') and
contains(normalize-space(@style), 'visible')]/div/div[normalize-
space(text( ))='{{Name}}']</Expression>
    <ReturnType>Table</ReturnType>
</Method>
<Method id="getSelectByFieldName">
    <Name>Get Select by Field Name</Name>
    <Context>Browser</Context>
    <Context>Dialog</Context>
    <Type>XPATH</Type>
    <Expression>.//input[@name='{{Name}}']/../img</Expression>
    <ReturnType>Table</ReturnType>
</Method>
```

While the examples above illustrated the use of an abstraction layer in connection with testing of GUIs and GUI elements, the abstraction layer can be utilized to abstract specific implementations of GUI elements into logical GUI element constructs in connection with additional use cases. For instance, GUI automation scripts can utilize an abstraction layer (e.g., to insulate the automation scripts from volatility or make the scripts at least partially implementation agnostic). A GUI automation script can cause interaction with a GUI to be automated, such as in connection with a demonstration of the GUI. For instance, training or support tools can utilize a GUI automation to demonstrate to a user how to interact with a GUI of a program by automating interactions with the GUI (e.g., analogous to a player piano illustrating to a pianist how to play a particular musical number by automatically playing the number for the pianist). An abstraction layer can be utilized both in the development (e.g., recording) of such scripts as well as the playback of such scripts.

In other examples, an abstraction layer can be utilized to facilitate GUI design and development. For instance, a developer can code a GUI at least partially through references to logical GUI element types defined in a GUI abstraction layer (i.e., rather than coding specific implementations of the GUI element (e.g., in HTML)). Abstracted GUI "source code" can be written using the logical GUI constructs of the abstraction layer. A GUI abstraction layer can then be used to translate, or convert, GUI elements referred to through such logical abstractions into suitable, specific implementations of the referred-to GUI elements, based on mappings of the GUI element abstractions to one or more potential specific implementations. For example, a GUI abstraction layer can be used to automatically convert a GUI element of logical GUI element type "form" and display name "Personal Information" into code embodying an HTML implementation (mapped to the "form" context in the abstraction layer) with display name "Personal Information". In cases where the abstraction layer maps GUI elements into specific implementations of those GUI elements in multiple, alternative GUI development languages (e.g., HTML4, HTML5, XML, etc.), etc., translation of the logical GUI element references into renderable, specific implementations can further include (user) designation of a particular one of the available multiple, alternative implementations to which the logical GUI element reference(s) is/are to be converted to. Applying such principles, systems can be provided that permit users to at least partially design and develop GUIs using logical constructs of GUI elements defined by abstraction layers, and then convert these constructs into executable GUI code that includes one or more specific implementations mapped to the corresponding logical constructs, among other examples.

Figure 11B:
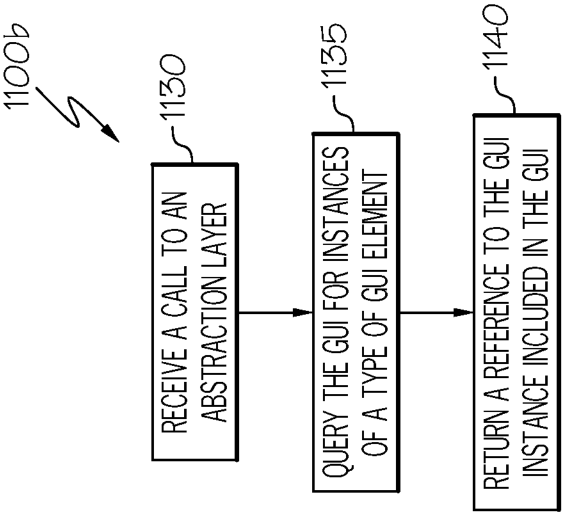
FIGS. 11A-11B are simplified flowcharts illustrating an example technique for using an abstraction layer in a test of a software system in accordance with at least one embodiment.
Figure 11A:
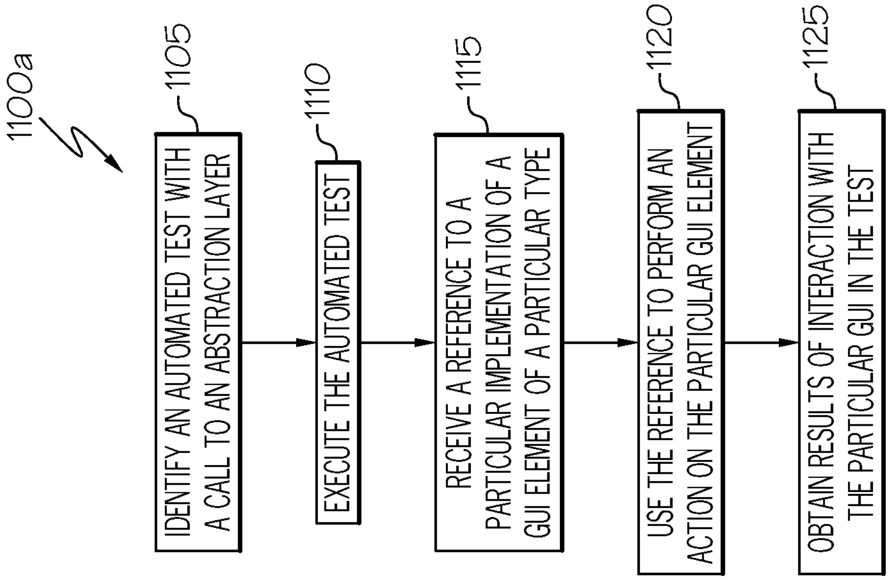

FIGS. 11A-11B are simplified flowcharts 1100*a-b* illustrating an example technique for using an abstraction layer in a test of a software system. In the example of FIG. 11A, an automated test is identified 1105 that is to be performed on one or more components of the software system including one or more elements of a GUI of the software system. Testing the one or more elements of the GUI can include simulating interactions with the GUI elements. The automated test can be written such that references to the precise implementations of the GUI elements is abstracted, thereby allowing the same test to be compatible with potentially multiple different versions of the GUI and the GUI elements. Accordingly, in some implementations, the test can include one or more calls to a GUI element abstraction layer to assist in translating references to logical abstractions of a GUI element into reference of the specific implementation of the GUI element as included in the code of the current version of the software system (and GUI) under test.

The automated test can be executed 1110 and execution of the test can include calling one or more method (or functions) defined in the abstraction layer. The functions can correspond to or otherwise identify a particular type of GUI element for which an abstraction has been defined in the abstraction layer. Calls to the function can include one or more parameters that more specifically identify the instance of the particular type of GUI element with which an interaction is to take place in a test. For instance, the parameter can include a display name of the GUI element and/or a context (such as parent GUI elements) of the GUI element, among potentially other examples. A response to the abstraction layer function call can be received 1115 and include a reference to the specific implementation of the GUI element as identified by the abstraction layer from a query of the GUI code. The reference can be used to perform the action on the particular GUI element of the system under test in accordance with the test. For instance, a testing system can use the reference to identify and correctly interact with the specific implementation of the GUI element. Alternatively, the abstraction layer can be used to simulate an interaction with the particular GUI element. The testing system can call on the abstraction layer to perform the interaction in accordance with the test of the software system by identifying the action to be performed and referencing the specific implementation of the GUI element (as returned in the reference (at 1120)). Likewise, results of the interaction with the GUI element in the test can be obtained 1125, either directly, using the testing system or at least partially using the abstraction layer. For instance, the testing system can observe the response of the GUI to the interaction, and use the abstraction layer to assist the testing system in mapping responses of specific implementations of GUI elements of the GUI to logical abstractions of those elements, among other potential examples.

Turning to FIG. 11B, an abstraction layer can receive a call, for instance, from a testing system, in connection with a test of a software system. The test can include simulating interactions with a GUI of the software system and observing the responses to the test. The test may refer to various elements of the GUI under test by logical abstractions (or constructs) corresponding to the respective types of the GUI elements. Calls to the abstraction layer can be received 1130 in connection with identifying specific implementations of the GUI elements in the GUI under test and can be used to both interact with the specific implementations of the GUI elements as well as obtain results of the interactions (e.g., describing the response of specific implementations of the GUI elements to the interactions). The call, in some cases, can be a call to a defined method (or function) of the abstraction layer and can specify the type of a particular GUI element as well as one or more parameters more specifically identifying the instance of the GUI element of the specified type. The file or code embodying the GUI and its constituent GUI elements can be queried 1135 to determine whether instances of the specified GUI element type (i.e., the abstraction or logical construct of a GUI element) are included in the GUI. If an instance of the specific GUI element type is identified in the GUI, the abstraction layer can return 1140 a reference to the specific GUI element type to the testing system. This reference can, in some cases, include the code embodying the specific GUI element type, a pointer to this code, or some other reference. The reference can be used, in some examples, by the testing system in connection with test actions performed on the specific implementation of the GUI element.

Figure 11C:
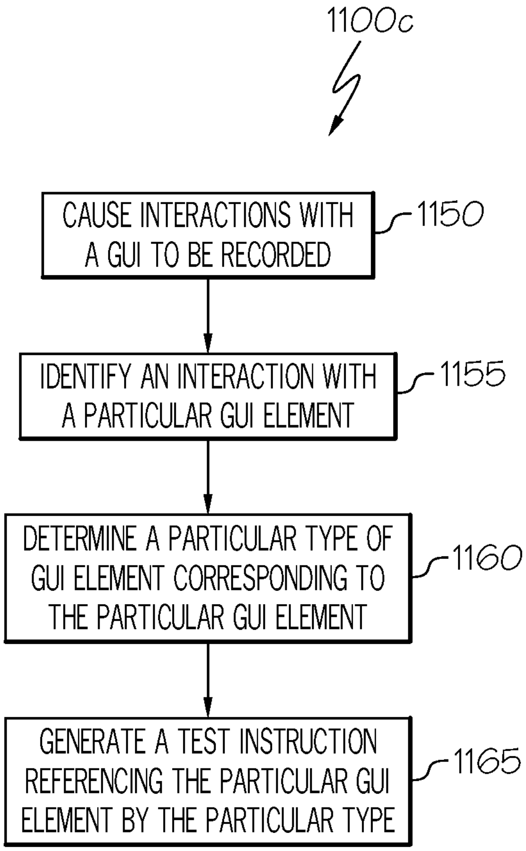
FIG. 11C is a simplified flowchart illustrating an example technique for recording interactions with a GUI for use in generating an automated test simulating the recorded interactions in accordance with at least one embodiment.

Turning now to FIG. 11C, a simplified flowchart 1100*c* is shown illustrating an example technique for recording interactions with a GUI for use in generating an automated test simulating the recorded interactions. In the example of FIG. 11C, interactions with a GUI can be caused to be recorded 1150. In some examples, a testing system can initiate recording such that subsequent interactions, during the recording, are identified 1155. In other instances, the testing system can initiate recording by invoking logic of an abstraction layer to conduct the recording. Recording, in either instance, can include capturing (e.g., at 1155) interactions with specific GUI elements of a GUI being observed in the recording. References to the particular implementations of the GUI elements in the observed GUI can be identified as well as the type of action(s) performed on the GUI element(s). Parameters of the interacted with GUI elements can also be identified, including the respective display names of the GUI elements, context of the GUI elements, etc.

Using the identification of the specific implementation of a GUI element, a corresponding abstraction of the GUI element defined in the abstraction layer can be determined 1160. For instance, in cases where the testing system (or other system besides the abstraction layer) records the interactions, the testing system can identify 1155 the specific implementation of an interacted-with GUI element and call the abstraction layer to query abstraction layer definitions to identify a corresponding, logical GUI element type that has been mapped to implementations such as that identified in the recording. The testing system can determine 1160 the corresponding GUI element type from a response received from the abstraction layer logic. Where the abstraction layer performs the recording, the abstraction layer can perform a similar query of the abstraction layer definitions to determine 1160 the corresponding GUI element type abstraction. At least a portion of a test instruction can be generated 1165 using the determined GUI element type as well as from other parameters of the interacted-with GUI element. For instance, in the cases where the particular interacted-with GUI element is a nested GUI element, the parent GUI element(s) of the particular GUI element can be determined together with the types of abstraction layer functions (e.g., methods) that would be called in order to navigate through the nested GUI elements to identify the specific implementation of the particular GUI element in a subsequent test. Generating 1165 a test instruction can include obtaining or identifying abstraction layer functions to be called in the test to identify or perform an action on the particular GUI element. The testing system can query the abstraction layer for such functions or the abstraction layer can query its library of abstraction layer functions for functions that correspond to a particular GUI element that was interacted-with during the recording. Parameters to be included in the function call can be identified from the parameters observed during the recording, such as the display name to be included in a "{{Name}}" field, among other examples. Where the abstraction layer generates 1165 the portion of the test instruction (e.g., the syntax of an abstraction layer method call that would be made by a testing system to the abstraction layer to request identification of a specific implementation of a particular logical GUI element type having a particular display name "Name"), the portion can be returned to the testing system (or other system), which the test system can use and include among other test instructions or portions of test instructions to generate a test to be executed by the testing system. The test can be reusable and refer to GUI elements by their respective logical abstractions and can cause at least portions of the recorded interactions to be re-played on a version of a GUI under test.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:

identifying a particular one of a plurality of interactions with a particular graphical user interface (GUI) of a software system as an interaction with a particular GUI element of the GUI, wherein the plurality of interactions comprise a plurality of recorded interactions;

determining, from an abstraction layer, a particular GUI element construct corresponding to a particular type of the particular GUI element, wherein the abstraction layer defines, for each of a plurality of GUI element types, a respective GUI element construct, and a plurality of different implementations of GUI elements of the particular type are mapped to the particular GUI element construct, and the particular GUI element comprises a particular one of the plurality of implementations of the GUI elements of the particular type; and generating at least a portion of an instruction for inclusion in a test of the software system, the instruction referencing the particular GUI element as an instance of the particular GUI element construct.

2. The method of claim 1, wherein each of the plurality of different implementations of GUI elements of the particular type comprises a particular implementation in code of a GUI element of the particular type.

3. The method of claim 2, wherein the instruction references the particular GUI element as an instance of the particular GUI element construct rather than by the particular implementation of the particular GUI element.

4. The method of claim 2, wherein the test is to automate reenactment of at least the particular interaction on the particular GUI element.

5. The method of claim 4, wherein the instruction references the particular GUI element as an instance of the particular GUI element construct to abstract details of the particular GUI element and abstracting reference to the particular GUI element in the instruction enables the test to automate reenactment of at least the particular interaction on implementations of the particular GUI element other than the particular implementation.

6. The method of claim 5, wherein determining the particular type of GUI element comprises querying the abstraction layer.

7. The method of claim 6, wherein querying the abstraction layer comprises a recursive query of at least a portion of the abstraction layer.

8. The method of claim 1, further comprising determining a parameter of the particular GUI element, wherein the instruction further references the particular GUI element based at least in part on the parameter.

9. The method of claim 8, wherein the parameter comprises a display name of the particular GUI element.

10. The method of claim 8, wherein the parameter comprises a context of the particular GUI element.

11. The method of claim 10, wherein determining the parameter comprises identifying that the particular GUI element is included within another GUI element of the particular GUI and the context corresponds to particular GUI element being included within the other GUI element.

12. The method of claim 11, further comprising:

determining a type of GUI element corresponding to the other GUI element; and generating at least a portion of another instruction for inclusion in the test, the other instruction referencing the other GUI element according to the abstraction layer as an instance of the GUI element construct corresponding to the type of the other GUI element.

13. The method of claim 1, wherein the instruction is to be executable to cause the abstraction layer to be called to return an identification of an implementation of the particular GUI element.

14. The method of claim 1, wherein the test instruction comprises a call to a particular one of a plurality of abstraction layer functions operable to cause a GUI under test to be queried for instances of the particular type of GUI element.

15. The method of claim 14, wherein the call comprises a parameter and the GUI under test is to be queried for instances of the particular type of GUI element corresponding to the parameter.

16. The method of claim 14, wherein the parameter comprises a parameter from a group comprising a context parameter and a display name parameter.

17. The method of claim 1, wherein the interactions comprise user interactions with the particular GUI.

18. The method of claim 1, further comprising executing the test on a version of the software system comprising a version of the particular GUI.

19. The method of claim 18, wherein executing the test comprises calling an abstraction layer function corresponding to GUI elements of the particular type; and receiving a reference to an implementation of the particular GUI element included in the version of the particular GUI in response to calling the abstraction layer function.

20. A computer program product comprising a computer readable storage medium comprising computer readable program code embodied therewith, the computer readable program code comprising:

computer readable program code configured to identify a particular one of a plurality of interactions with a particular graphical user interface (GUI) of a software system as an interaction with a particular GUI element of the GUI, wherein the plurality of interactions comprise a plurality of recorded interactions;

computer readable program code configured to determine, from an abstraction layer, a particular GUI element construct corresponding to a particular type of the particular GUI element, wherein the abstraction layer defines, for each of a plurality of GUI element types, a respective GUI element construct, a plurality of different implementations of GUI elements of the particular type are mapped to the particular GUI element construct, and the particular GUI element comprises a particular one of the plurality of implementations of the GUI elements of the particular type; and computer readable program code configured to generate at least a portion of an instruction for inclusion in a test of the software system, the instruction referencing the particular GUI element as an instance of the particular GUI element construct.

21. A system comprising:

a data processing apparatus;

a memory element;

a recording logic to:

cause interactions with a particular graphical user interface (GUI) of a software system to be recorded;

identify a particular one of the interactions as an interaction with a particular GUI element of the GUI;

determine a particular type of the particular GUI element;

determine, from an abstraction layer, a particular GUI element construct corresponding to the particular type, wherein the abstraction layer defines, for each of a plurality of GUI element types, a respective GUI element construct, and a plurality of different implementations of GUI elements of the particular type are mapped to the particular GUI element construct; and generate at least a portion of an instruction for inclusion in a test of the software system, the instruction referencing the particular GUI element as an instance of the particular GUI element construct.

* * * * *